US010666941B1

(12) United States Patent
Doron

(10) Patent No.: US 10,666,941 B1
(45) Date of Patent: *May 26, 2020

(54) LOW BITRATE ENCODING OF PANORAMIC VIDEO TO SUPPORT LIVE STREAMING OVER A WIRELESS PEER-TO-PEER CONNECTION

(71) Applicant: Ambarella International LP, Santa Clara, CA (US)

(72) Inventor: Moshe Doron, San Francisco, CA (US)

(73) Assignee: Ambarella International LP, Santa Clara, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/297,455

(22) Filed: Oct. 19, 2016

Related U.S. Application Data

(63) Continuation-in-part of application No. 15/092,071, filed on Apr. 6, 2016.

(51) Int. Cl.
*H04B 1/66* (2006.01)
*H04N 19/115* (2014.01)
(Continued)

(52) U.S. Cl.
CPC ......... *H04N 19/115* (2014.11); *H04N 19/167* (2014.11); *H04N 19/172* (2014.11); *H04N 19/196* (2014.11); *H04N 21/2387* (2013.01); *H04N 21/47217* (2013.01); *H04L 67/104* (2013.01); *H04L 67/12* (2013.01); *H04W 84/18* (2013.01)

(58) Field of Classification Search
CPC .............. B64C 39/024; H04N 5/23293; H04N 5/23238; H04N 21/21805; H04N 13/194; H04N 13/243; H04N 21/4728; H04N 13/111; H04N 13/128; H04N 13/161
USPC ........................................................ 375/240
See application file for complete search history.

(56) References Cited

U.S. PATENT DOCUMENTS

2010/0158109 A1* 6/2010 Dahlby .............. H04N 7/17318
375/240.03
2014/0327770 A1* 11/2014 Wagreich ............. G05D 1/0038
348/148

(Continued)

FOREIGN PATENT DOCUMENTS

GB         2543320 A  *  4/2017  ....... H04N 21/23439
WO    WO-2015155406 A1 * 10/2015  ............. G03B 37/04

*Primary Examiner* — Masum Billah
(74) *Attorney, Agent, or Firm* — Christopher P. Maiorana, PC

(57) ABSTRACT

An apparatus comprising an interface and a processor. The interface may be configured to receive video streams each from a respective capture device, receive data from a playback device to determine a region of interest and output one or more upcoming video frames of an encoded panoramic video stream to a communication device. The processor may be configured to (a) generate the encoded panoramic video stream from the video streams, (b) select a target area for the upcoming frames of the encoded panoramic video corresponding to the region of interest, (c) encode the target area using first parameters, (d) encode a remaining area of the panoramic video outside of the target area using second parameters and (e) present the upcoming frames to the interface. Encoding using the first parameters generates a different bitrate than using the second parameters.

20 Claims, 13 Drawing Sheets

(51) Int. Cl.
   *H04N 19/167*    (2014.01)
   *H04N 19/172*    (2014.01)
   *H04N 19/196*    (2014.01)
   *H04N 21/472*    (2011.01)
   *H04N 21/2387*   (2011.01)
   *H04W 84/18*     (2009.01)
   *H04L 29/08*     (2006.01)

(56)         References Cited

U.S. PATENT DOCUMENTS

2016/0277772 A1*  9/2016  Campbell ........ H04N 21/21805
   2016/0297522 A1* 10/2016  Brulez .................. B64C 39/024
   2017/0030703 A1*  2/2017  Cosic ..................... G01B 11/02
   2017/0111678 A1*  4/2017  Hwang .................... H04N 5/44

* cited by examiner

US 10,666,941 B1

LOW BITRATE ENCODING OF PANORAMIC VIDEO TO SUPPORT LIVE STREAMING OVER A WIRELESS PEER-TO-PEER CONNECTION

This application relates to U.S. Ser. No. 15/092,071, filed Apr. 6, 2016, which is incorporated by reference in its entirety.

FIELD OF THE INVENTION

The invention relates to video encoding generally and, more particularly, to a method and/or apparatus for implementing low bitrate encoding of panoramic video to support live streaming over a wireless peer-to-peer connection.

BACKGROUND

Panoramic video typically involves high resolution footage to capture a large field view (i.e., an entire 360 degree field of view (FOV)). Streaming panoramic video involves a high bitrate link. Typical networks, like the Internet, have limited streaming bandwidth. Cellular or wireless networks also typically have limited bandwidth. Streaming high bitrate video over 3G/4G/LTE networks consumes a lot of data. In conventional panoramic video playback, on the display side, the user sees only a small part of the panoramic image. The small part of the panoramic image that the user sees is called a region of interest (ROI).

Conventional panoramic video playback typically streams the entire panoramic field of view (i.e., a 360 degree field of view). Streaming the entire panoramic field of view allows the region of interest to be changed in response to the user moving his or her head. A change in region of interest needs to happen very fast (typically <20 ms) to avoid a noticeable delay on the display side. Longer delays tend to provide a poor user experience, and in many cases trigger a sickness feeling.

Operating unmanned aerial vehicles (or drones) has become a popular hobby. One particular area that has increased in popularity is racing camera-equipped drones. Drones can be used in combination with live video feeds (i.e., watched using video headsets) from the camera-equipped drones to provide a first-person view flying experience. A first-person video feed from the drone allows for an immersive flying experience.

Drones can be controlled remotely by a pilot. To provide an enjoyable first-person flying experience, the video feed from the drone should be transmitted with low-latency. Flying a drone with a camera provides an opportunity to capture panoramic aerial images. However, flying a drone and communicating remotely with a pilot involves wireless communication that has limited bandwidth available.

It would be desirable to implement low bitrate encoding of panoramic video to support live streaming over a wireless peer-to-peer connection.

SUMMARY

The invention concerns an apparatus comprising an interface and a processor. The interface may be configured to receive video streams each from a respective capture device, receive data from a playback device to determine a region of interest and output one or more upcoming video frames of an encoded panoramic video stream to a communication device. The processor may be configured to (a) generate the encoded panoramic video stream from the video streams, (b) select a target area for the upcoming frames of the encoded panoramic video corresponding to the region of interest, (c) encode the target area using first parameters, (d) encode a remaining area of the panoramic video outside of the target area using second parameters and (e) present the upcoming frames to the interface. Encoding using the first parameters generates a different bitrate than using the second parameters.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing (i) low bitrate encoding of panoramic video, (ii) support for live streaming over high latency and/or low bandwidth peer-to-peer network, (iii) a panoramic video stream with a high bitrate portion and a low bitrate portion, (iv) a dynamic update of a panoramic video stream, (v) an improved streaming efficiency that limits a negative impact to the end user, (vi) encoding based on what a user is viewing, (vii) a portion of a panoramic video viewed by a user with compression that has less lossiness than a compression used for remaining portions of the panoramic video, (viii) video stitching operations on-board an unmanned aerial vehicle and/or (ix) a system that may be implemented as one or more integrated circuits.

Figure 1:
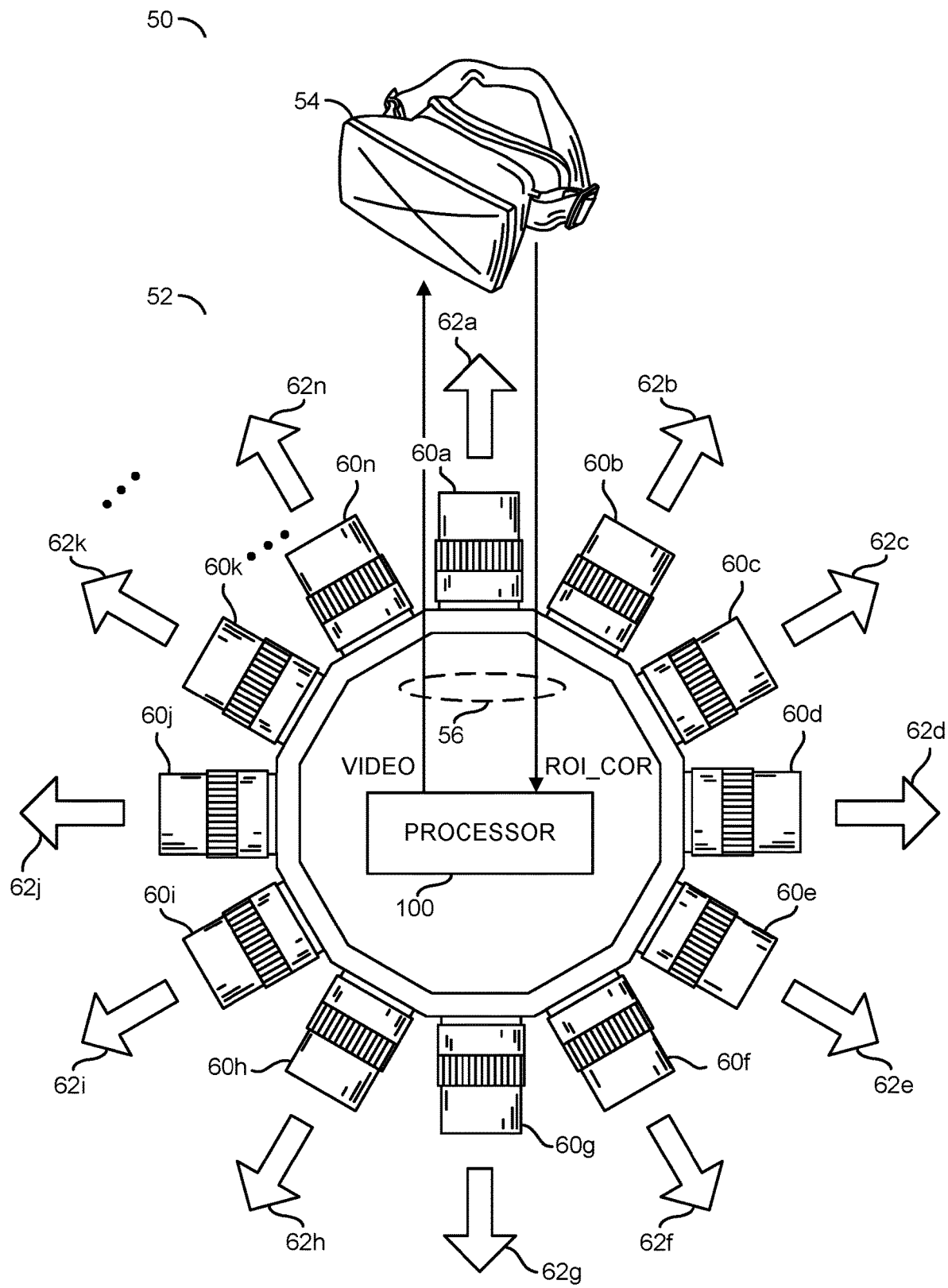
FIG. 1 is a diagram of an embodiment of the invention.

Referring to FIG. 1, a block diagram of a system 50 is shown in accordance with an embodiment of the invention. The system 50 generally comprises a device (or camera) 52, and a device (or headset or display or playback device) 54. The camera 52 and the display 54 may be connected through a network 56. In one example, the network 56 may be a peer-to-peer (P2P) network (e.g., a direct connection between nodes without connecting to a central server). The camera 52 may be configured to capture a panoramic field of view. In one example, the panoramic field of view may allow an end user to view a video of the environment surrounding the camera 52 (e.g., a live stream). In another example, the panoramic field of view may allow the end user to view a previously recorded video of the environment surrounding the camera 52. The playback device 54 may be configured to display the panoramic field of view to the end user.

The camera 52 may be implemented as a panoramic field of view camera (e.g., a camera configured to record panoramic video, spherical video, a 360 degree video and/or less than a 360 degree video, etc.). In some embodiments, the camera 52 may be implemented as a multi-sensor camera. In some embodiments, the camera 52 may be implemented having one or more wide angle (or fisheye) lenses. The implementation of the camera 52 may be varied according to the design criteria of a particular implementation.

Generally, the panoramic video may comprise a large field of view generated by one or more lenses/camera sensors. One example of a panoramic video may be an equirectangular 360 video. Equirectangular 360 video may also be called spherical panoramas. Panoramic video may be a video that provides a field of view that is larger than the field of view that may be displayed on a device used to playback the video (e.g., the playback device 54). In some embodiments, portions of the panoramic video may be cropped to the size of the display of the playback device 54 (e.g., portions of the panoramic video outside of the cropped portion may be discarded and/or not displayed). In some embodiments, the panoramic video may be panned in one or more directions to see additional portions of the panoramic video outside of the field of view of the playback device 54. For example, the panoramic video may comprise a spherical video, a hemispherical video, a 360 degree video, a wide angle video, a video having less than a 360 field of view, etc.

Panoramic videos may comprise a view of the environment near the camera 52. In one example, the entire field of view of the panoramic video may be captured at generally the same time (e.g., each portion of the panoramic video represents the view from the camera 52 at one particular moment in time). In some embodiments (e.g., when the camera 52 implements a rolling shutter sensor), a small amount of time difference may be present between some portions of the panoramic video. Generally, each video frame of the panoramic video comprises one exposure of the sensor (or multiple sensors) capturing the environment near the camera 52.

In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, the panoramic video may comprise a spherical field of view (e.g., capture video above and below the camera 52). In some embodiments, the panoramic video may comprise a field of view that is less than a spherical field of view (e.g., the camera 52 may be configured to capture the ground below and the areas to the sides of the camera 52 but nothing directly above). The implementation of the panoramic video may be varied according to the design criteria of a particular implementation.

The headset 54 may be implemented as a display, a wearable headset, or other panoramic video viewing device. The display 54 may be worn (or viewed) by the user. The display 54 may be configured to display video frames (e.g., panoramic video frames) of the panoramic video. The display 54 may present a portion of each of the panoramic video frames in response to a direction the user is looking. The portion of each of the panoramic video frames that is displayed may be a region of interest (ROI). The region of interest may represent a field of view watched by a user of the display 54. For example, the display 54 may receive the panoramic video frames and refresh the output to show only the region of interest.

The display 54 may be configured to transmit a signal (e.g., ROI_COR) to the camera 52 (or capture device). The signal ROI_COR may be a coordinate signal that may contain information relating to the direction the user is looking (e.g., the ROI). The display 54 may generate the signal ROI_COR in response to the region of interest displayed to the user. The signal ROI_COR may also comprise information about a playback capability of the playback device 54 (e.g., playback resolution, size of the viewport, aspect ratio, supported decoders, etc.). In an example, the display 54 may transmit the signal ROI_COR over the network 56. In one example, the network 56 may be implemented using a wired connection. In another example, the network 56 may be implemented using a wireless connection (e.g., Wi-Fi, Bluetooth, ZigBee, radio frequency, etc.). The signal ROI_COR may correspond to a field of view currently visible on the playback device 54.

The camera 52 generally comprises a number of capture devices 60*a*-60*n*. Each of the capture devices 60*a*-60*n* may be implemented as a sensor, a standalone camera, or other video capture device. Each of the capture devices 60*a*-60*n* is shown pointing in a corresponding direction 62*a*-62*n*. By capturing each of the directions 62*a*-62*n*, the camera 52 may capture a panoramic view of the environment surrounding the camera 52. In the embodiment shown, the directions 62*a*-62*n* may surround the camera 52. However, the capture devices 60*a*-60*n* may be configured to capture fields of view above and/or below a level of the camera 52.

The camera 52 may include an apparatus 100. In some embodiments, the apparatus 100 may be a processor and/or a system on chip (SoC). In some embodiments, the apparatus 100 may be implemented as a printed circuit board comprising one or more components. The apparatus 100 may be configured to encode video frames captured by each of the capture devices 60*a*-60*n*. In some embodiments, the apparatus 100 may be configured to perform video stitching operations to stitch video frames captured by each of the capture devices 60*a*-60*n* to generate the panoramic field of view (e.g., the panoramic video frames).

The camera 52 may present a signal (e.g., VIDEO). The signal VIDEO may be an encoded video signal that may be presented to the display 54. In an example, the signal VIDEO may be an encoded (e.g., compressed or partially compressed) version of raw video data (e.g., pixels) captured by the capture devices 60*a*-60*n*. For example, the signal VIDEO may be presented to the playback device 54 via the network 56.

The apparatus 100 may receive the signal ROI_COR (e.g., via the network 56). The panoramic video signal VIDEO may have a number of regions (or windows) that may each be encoded at a different bitrate and/or amount of compression (to be described in more detail in connection with FIG. 4 and FIG. 5). The signal ROI_COR may be used by the apparatus 100 to adjust the encoding of the signal VIDEO. The apparatus 100 may be configured to encode a window slightly larger than the region of interest displayed to the user using a high quality compression (e.g., high bitrate and/or less lossiness). The apparatus 100 may be configured to encode a remaining area of the panoramic video in a lower quality compression (e.g., low bitrate and/or more lossiness). The size of the windows and/or the quality of the compression may be varied according to the design criteria of a particular implementation.

Generally, the high quality compression provides a version of the video (or portions of the video) captured by the camera 52 that has less lossiness and/or visual quality than the lower quality compression. For example, the image quality of the high quality compression may be greater than the image quality of the lower quality compression. In some embodiments, a number of quantization parameters used for compression may be reduced for the lower quality compression.

Various factors may correspond to the type of compression. One factor may be a bitrate of the compression. In an example, the higher quality compression may have a higher bitrate (e.g., which may need a higher bitrate link to transfer via the network 56) than the lower quality compression. In another example, the lower quality compression may be a black (or blank) video. Another factor may be an amount of processing to encode and/or decode the compression.

In an example, more time and/or power may be consumed by the apparatus 100 to generate one type of encoding (e.g., using H.265 encoding) than another type of encoding (e.g., using H.264 encoding). Similarly, more time and/or power may be consumed by the playback device 54 to decode the higher quality compression at a lower bitrate than the lower quality compression at a higher bitrate. In another example, a factor may be the specifications of the playback device 54 (e.g., playback resolution, size of the viewport, aspect ratio, supported decoders, etc.) provided in the signal ROI_COR. In some embodiments, a variable bitrate may be used for the high quality and/or the lower quality compression. The bitrate, lossiness and/or processing used for the compression may be varied according to the design criteria of a particular implementation.

The apparatus 100 may generate the signal VIDEO having varying regions encoded at different bitrates (or amounts of lossiness). The signal VIDEO may be generated in response to the signal ROI_COR. The signal VIDEO and/or the signal ROI_COR may be transmitted using a low-rate link (e.g., a wireless connection).

The apparatus 100 may transfer the stored signal VIDEO comprising the high quality portion for the region of interest and the lower-quality version of the entire panoramic video (e.g., to be used for areas outside the region of interest) based on information from the signal ROI_COR from the playback device 54. The apparatus 100 may stream one video signal comprising a target area (e.g., the window slightly larger than the region of interest) having a high quality and another video stream comprising the entire panoramic video stream having a low quality (e.g., to be used for areas outside the region of interest). The playback device 54 may combine the streams for playback.

Video data may be captured by sensors (e.g., the capture devices 60a-60n) of the camera 52. In some embodiments, the video data from the capture devices 60a-60n may be uncompressed (e.g., raw) video data. In some embodiments, the video data may be encoded at a high bitrate. For example, the signal may be generated using a lossless compression and/or with a low amount of lossiness. In some embodiments, the video data captured by the capture devices 60a-60n may be presented to the apparatus 100 in the camera 52. The apparatus 100 may encode the video data captured by the capture devices 60a-60n to generate the signal VIDEO.

Encoding the signal VIDEO may be performed with various parameters to generate different bitrates. For example, a video encoded using one set of parameters may result in an encoded video having one bitrate (e.g., higher) and the same video encoded using another set of parameters may result in an encoded video having a different bitrate (e.g., lower). For example, one set of parameters may be used by the apparatus 100 to encode the target area of the upcoming video frames of the signal VIDEO and another set of parameters may be used by the apparatus 100 to encode the remaining area of the upcoming video frames of the signal VIDEO. Various parameters may be implemented.

Encoding using parameters that result in a lower bitrate may result in a compression of the signal VIDEO (or a portion of the signal VIDEO) that may reduce bandwidth consumption when transmitting the encoded panoramic video stream VIDEO. In one example, the parameters may be quantization parameters. In another example, the parameters may be a rate factor, deinterlacing, a constant bitrate, a variable bitrate, filters, video codecs, frame rate, a file container, etc. The types of parameters may be varied according to the design criteria of a particular implementation.

Figure 2:
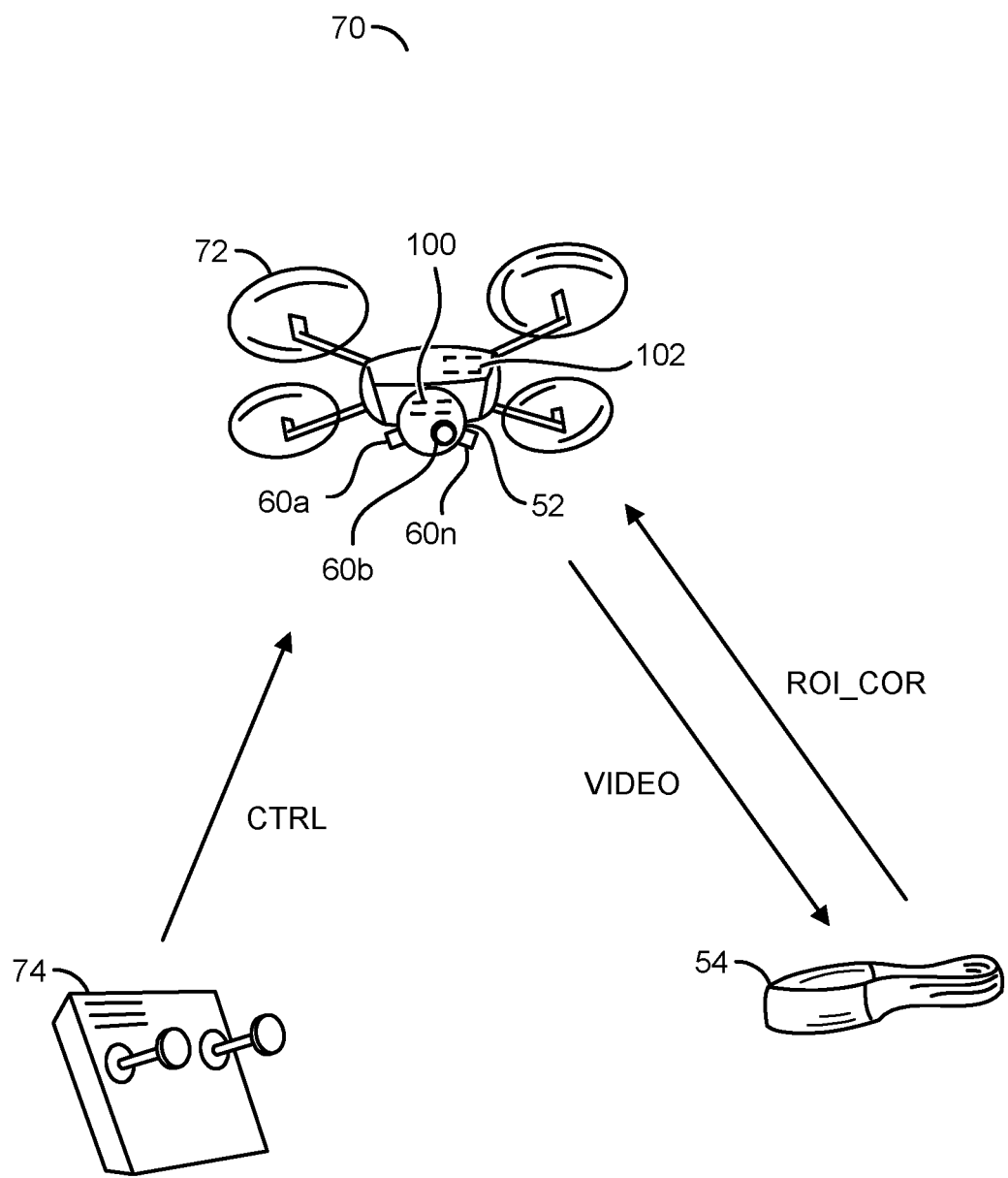
FIG. 2 is a diagram of a context of the invention.

Referring to FIG. 2, a diagram illustrating a system 70. The system 70 may comprise a device 72, a device 74 and the playback device 54. The device 72 may be an unmanned aerial vehicle. The device 74 may be a remote controller. The camera 52 is shown as part of the unmanned aerial vehicle 72. The unmanned aerial vehicle (or drone) 72 may comprise the camera 52, the capture devices 60a-60n, the apparatus 100 and/or a block (or circuit) 102. The circuit 102 may be a communication device (e.g., a wireless transmitter). The wireless communication device may be configured to send and/or receive data.

The wireless communication device 102 may transmit the signal VIDEO to the playback device 54. The wireless communication device 102 may receive the signal ROI_COR from the playback device 54. The wireless communication device 102 may receive a signal (e.g., CTRL) from the remote controller 74. The signal CTRL may be configured to control the drone 72.

Different communication channels may be implemented to transmit video (e.g., the signal VIDEO) and drone control (e.g., the signal CTRL). In an example, the communication device 102 may implement one channel to transmit video and a different remote-control (RC) channel for drone control (e.g., input from a pilot using the remote control 74). Example frequencies may comprise 900 MHz, 1.2 GHz, 2.4 GHz and/or 5.8 GHz. In an example, if the drone 72 implements a RC transmitter on one of the frequencies for control, then, in order to avoid interference, another one of the frequencies should be selected for the transmitting the signal VIDEO. For example, many video transmitters operate at 5.8 GHz. Other frequencies may be implemented. The channels used for a particular type of communication (e.g., video or control) and/or the frequencies used may be varied according to the design criteria of a particular implementation.

In some embodiments, the signal ROI_COR may be transmitted using the same channel as the signal CTRL. In an example, the playback device 54 may transmit the signal ROI_COR to the remote controller 74, and the remote controller 74 may transmit both the signal CTRL and the signal ROI_COR using the same channel. Using the same channel to transfer the signal CTRL and the signal ROI_COR may ensure sufficient bandwidth is available on the channel used to transmit the signal VIDEO. In some embodiments, the signal ROI_COR may be sent using the same channel as the signal VIDEO. In some embodiments, the signal ROI_COR may be transmitted by the playback device 54 using a different channel than the signal VIDEO and a different channel than the signal CTRL.

In some embodiments, the signal CTRL may be optional. For example, the drone 72 may implement an autonomous drone. In embodiments where the drone 72 is autonomous, the drone 72 may travel a pre-determined path and/or make decisions about where to travel without input from a pilot. In embodiments where the drone 72 is autonomous, the communication device 102 may still transmit the signal VIDEO and/or receive the signal ROI_COR.

The drone 72 may be configured to fly and travel in many directions and/or have an extended range of flight. Generally, a wired connection between the drone 72 and the playback device 54 may not be practical. Similarly, a wired connection between the drone 72 and a central server and/or a computing device may be impractical. To communicate with the playback device 54, the drone 72 may implement a wireless connection using the wireless communication device 102. The wireless connection may have a limited bandwidth for transmitting data. Panoramic videos may comprise a large amount of data. Without the apparatus 100 to encode the panoramic video to reduce a bitrate of the panoramic video, the wireless connection between the drone 72 and the playback device 54 may not be possible without introducing lags and/or delay.

The apparatus 100 may be configured to reduce a bitrate of portions of the panoramic video while providing a high quality target area corresponding to where the viewer is currently looking. The apparatus 100 may be implemented to enable a wireless transmission of the signal VIDEO that may be played back smoothly using the playback device 54 (e.g., limited delay and/or buffering of the panoramic video).

The system 70 may be a peer-to-peer implementation. The drone 72 (using the wireless communication device 102) may form a peer-to-peer connection with the playback device 54. In an example, the signal VIDEO may be generated by components (e.g., the apparatus 100) on the drone 72 and transmitted directly from the drone 72 to the playback device 54. To implement the peer-to-peer connection, the apparatus 100 may be configured to generate the panoramic video from the video streams captured by the capture devices 60a-60n on-board the drone 72. For example, the apparatus 100 may be configured to perform video stitching operations to stitch together the various fields of view captured by each of the capture devices 60a-60n to generate panoramic (or spherical or 360 degree) video frames.

To implement the communication of the panoramic video using the peer-to-peer connection, the apparatus 100 may be configured to encode the panoramic video frames. To implement the communication of the panoramic video using the peer-to-peer connection, the apparatus 100 may be configured to select a target area for one or more upcoming frames of the panoramic video stream corresponding to the region of interest of the playback device 54 and encode the target area using one set of parameters (e.g., to provide a high quality video) and encode a remaining area using another set of parameters. The apparatus 100 may be configured to perform calculations for encoding the panoramic video efficiently to conserve battery life for the drone 72.

Figure 3:
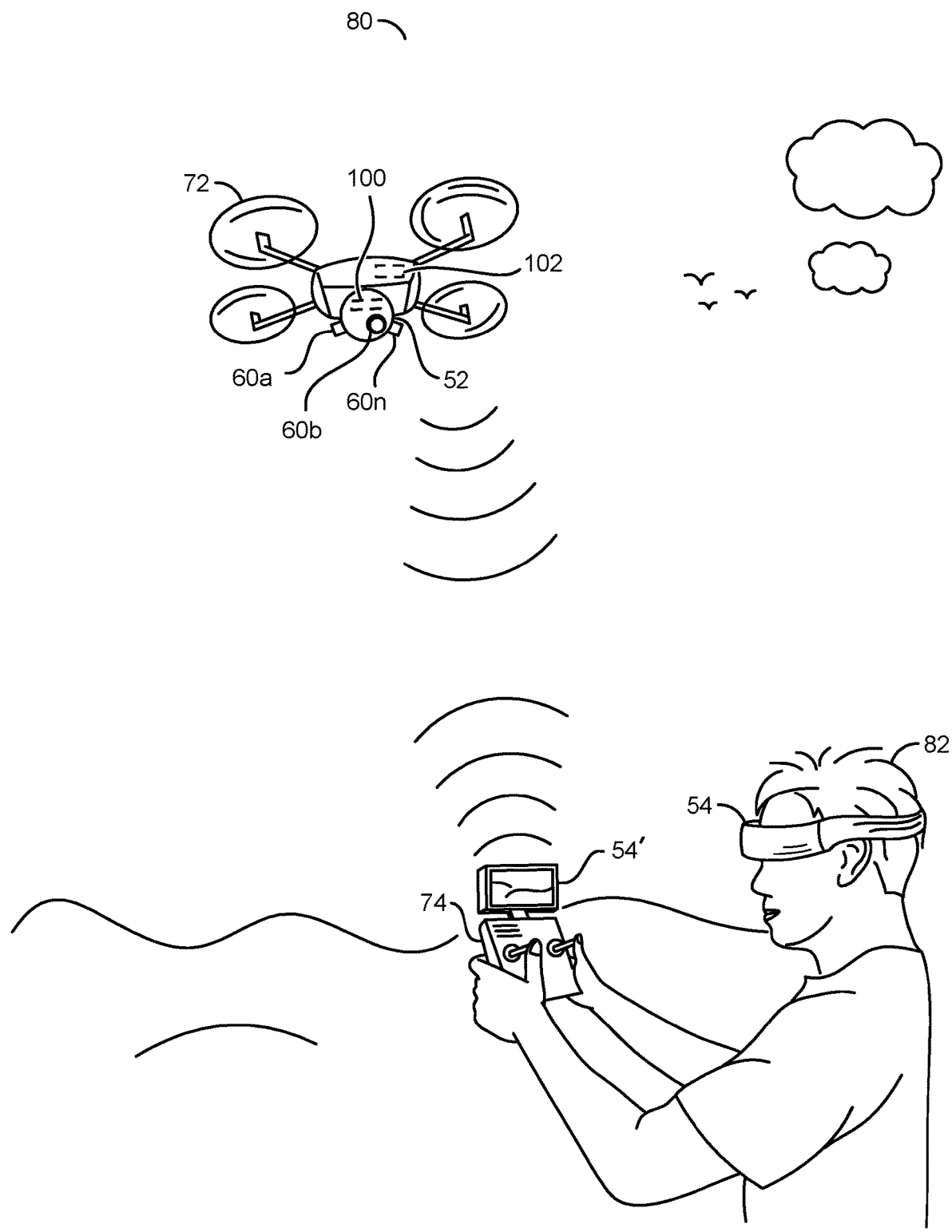
FIG. 3 is a diagram illustrating using a first-person view to pilot an unmanned aerial vehicle.

Referring to FIG. 3, a diagram illustrating using a first-person view for piloting an unmanned aerial vehicle is shown. A system 80 is shown. The system 80 may comprise the unmanned aerial vehicle (or drone) 72, the remote controller 74, a pilot 82, the playback (or viewing) device 54, the apparatus 100, the communication device 102 and/or the capture devices 60a-60n. The system 80 may be implemented to control the drone 72 and/or receive video from the perspective of the drone 72.

The drone 72 may be capable of hovering and/or moving in a variety of directions. For example, the drone 72 may accelerate and/or change direction quickly. The drone 72 may comprise the apparatus 100, the communication device 102, the capture devices 60a-60n and/or other components (not shown). In some embodiments, the communication device 102 and/or the capture devices 60a-60n may be a component of the apparatus 100.

Each of the captures devices 60a-60n may be directed towards one particular direction to provide coverage for a full 360 degree field of view. In some embodiments, less than a 360 degree view may be captured by the capture devices 60a-60n (e.g., a 270 degree field of view, a 180 degree field of view, etc.). In some embodiments, the capture devices may move (e.g., the direction of the capture devices may be controllable). In some embodiments, one or more of the capture devices 60a-60n may be configured to implement a zoom (e.g., the capture devices 60a-60n may zoom in/out independent of each other).

In some embodiments, the capture devices 60a-60n may be configured to capture a panoramic video that comprises a spherical field of view (e.g., capture video above and below the drone 72). In some embodiments, the capture devices 60a-60n may be configured to capture a panoramic field of view that is less than a spherical field of view (e.g., the capture devices 60a-60n may be configured to capture the ground below and the areas to the sides of the drone 72). Generally, each of the capture devices 60a-60n may capture video frames that provide a portion of a field of view that may be stitched together by the apparatus 100 to provide a field of view that is wider than the field of view captured by each individual one of the capture devices 60a-60n. In some embodiments, the capture devices 60a-60n may be implemented as a single capture devices configured to capture a wide angle (e.g., the apparatus 100 may be configured to dewarp the captured video). The implementation of the capture devices 60a-60n may be varied according to the design criteria of a particular implementation.

The apparatus 100 may be configured to capture images and/or video of the environment near the drone 72. For example, the apparatus 100 may capture the environment in the directions 62a-62n of the capture devices 60a-60n. The apparatus 100 may be configured to generate video signals based on the captured images from the capture devices 60a-60n. The apparatus 100 may be configured to perform video stitching operations on the video streams received from the capture devices 60a-60n to generate the panoramic video stream. The apparatus 100 may format (or encode) the video signals to be transmitted wirelessly and/or stored locally. For example, the drone 72 may comprise the wireless transmission module 102, and the apparatus 100 may provide the video signal (e.g., the encoded panoramic video stream) to the wireless transmission module 102. The drone 72 is shown transmitting data wirelessly. For example, the drone 72 may wirelessly transmit a video stream generated by the apparatus 100.

The pilot 82 is shown holding the remote controller 74 and wearing the playback device 54. The playback device 54 is shown as a headset. In some embodiments, the playback device 54' may be implemented as a screen and/or handheld device (e.g., a screen that is part of the remote controller 74). The remote controller 74 may be configured to send the control data signal CTRL to the drone 72. For example, the remote controller 74 may implement a radio frequency (RF) transmission to control the drone 72. The pilot 82 may provide input to the remote controller 74 to direct the movement of the drone 72.

The playback device 54' is shown as a screen that is part of the remote controller 74. In some embodiments, the pilot 82 may not wear the headset 54. For example, the playback device 54' may be implemented as a touchscreen device. The pilot 82 may control the region of interest by swiping and/or dragging a finger across the touchscreen device 54'. The playback device 54' may transmit the signal ROI_COR in response to the input from the pilot 82.

In some embodiments, the playback device 54' may be implemented as a smartphone and/or a tablet computing device. A display of the smartphone and/or tablet computing device may display the current region of interest to the pilot 82. Adjusting the region of interest may be performed by the pilot 82 using input (e.g., touch, a stylus, an add-on peripheral such as a gamepad) to the playback device 54'. In some embodiments, the playback device 54' may be a desktop computer, laptop computer, notebook computer, etc. A computer monitor may be used to view the current region of interest. Computer input peripherals may be used by the pilot 82 to adjust the region of interest and/or provide the signal CTRL to the drone 72. In an example, a mouse cursor, keyboard controls, a joystick, and/or a software interface may be implemented for the computer to control the region of interest. The implementation of the playback device 54' may be varied according to the design criteria of a particular implementation.

The playback device 54 may be configured to receive the video stream VIDEO from the drone 72. The video stream may be a live (or near-live) video feed of the encoded panoramic video stream. The video stream may provide the pilot 82 with a view from the perspective of the drone 72. When the viewing device 54 is implemented as a headset, the video stream may provide a first-person view (FPV) of the drone 72. The playback device 54 may display the region of interest (e.g., the target area of the encoded panoramic video stream) to the pilot 82.

As the pilot 82 moves his or her head, the target area may be updated and the playback device 54 may update the display of the target area to correspond to the head movements of the pilot 82. The playback device 54 may transmit the signal ROI_COR to the apparatus 100 (via the communication device 102) to indicate the coordinates that correspond to the head movements of the pilot 82. The apparatus 100 may change the target area for the encoded panoramic video stream in response to the signal ROI_COR and the higher quality compression may correspond to the coordinates of the head position of the pilot 82.

In some embodiments, the system 80 may be implemented for FPV racing of the drone 72 and/or aerial surveying. For example aerial surveying may be used to implement security surveillance from above. The headset 54 may receive the video stream live from the drone 72. The pilot 82 may view the video stream using the headset 54 to see a live view from the perspective of the drone 72. The pilot 82 may react to the environment by viewing the video captured by the apparatus 100 and provide control to the drone 72 using the remote controller 74. In a racing embodiment, the pilot 82 may need to react quickly to traverse a set course as fast as possible and/or prevent the drone 72 from crashing and/or traveling out of the bounds of the course.

To provide a useful view to the pilot 82, the video stream may be generated with low and/or negligible delay. The pilot 82 may be unable to react appropriately if there is lag (e.g., a delay) between what is viewed on the viewing device 54 and where the drone 72 is actually located. The apparatus 100 may be configured to generate a panoramic video that may be transmitted using a lower bitrate that still provides a high quality visual representation of the target area (e.g., the region of interest where the pilot 82 is currently looking). Without the apparatus 100, the quality of the video that the pilot 82 sees in the headset 54 may be low-quality and/or laggy. For example, low-quality and/or laggy video may be distracting and/or reduce a feeling of immersiveness. In another example, low-quality and/or laggy video may cause nausea for the pilot 82. The apparatus 100 may be configured to provide a low-latency video stream from the drone 72 to the viewing device 54 without sacrificing video quality in the target area. The apparatus 100 may be configured to correct visual artifacts (e.g., shakiness due to the movement of the drone 72, wobbling caused by a rolling shutter effect, lag, etc.) in the video stream.

Figure 4:
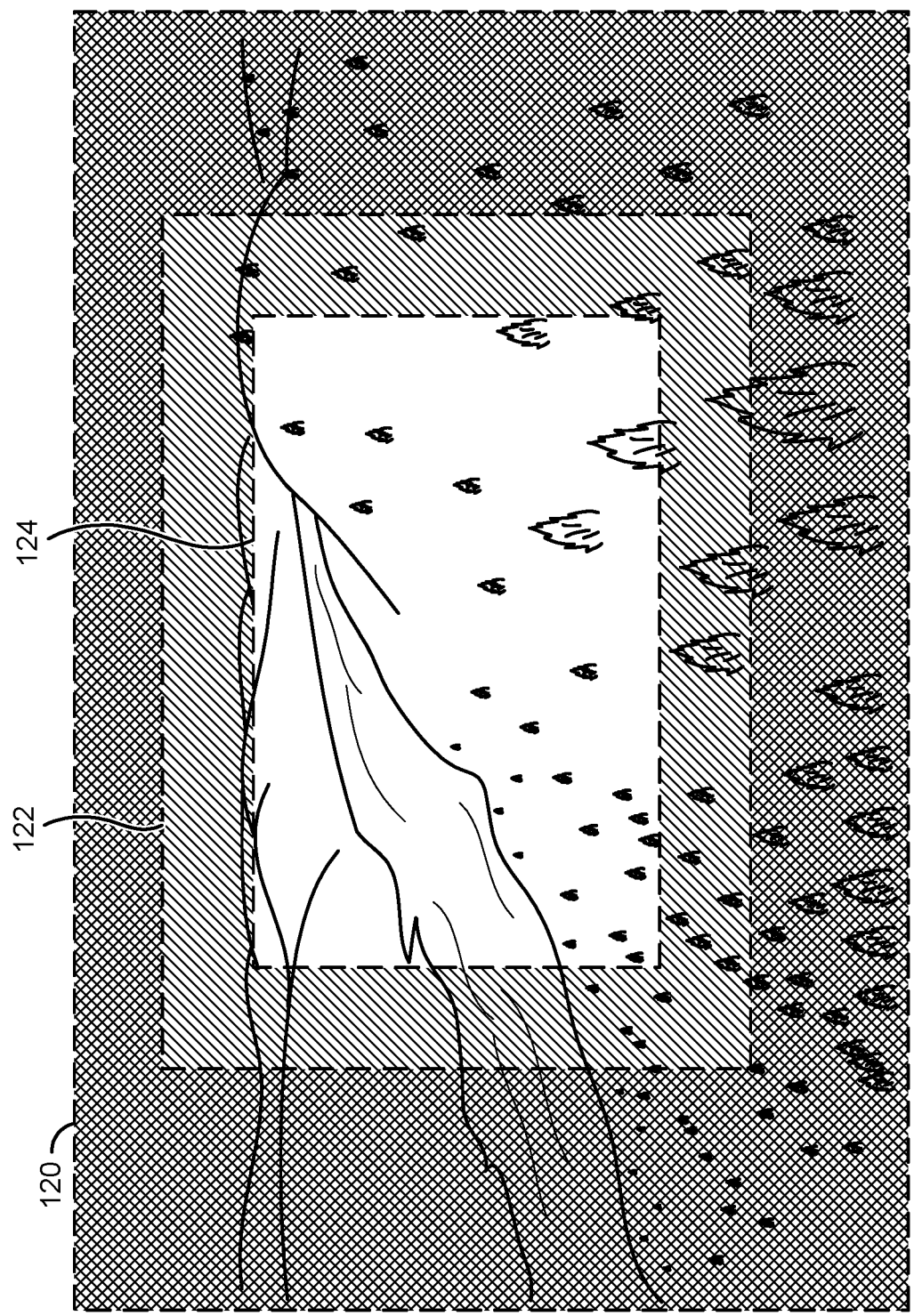
FIG. 4 is a diagram of a sample portion of video.

Referring to FIG. 4, a diagram of a sample portion of the signal VIDEO is shown. The portion may be an equirectangular projection of the panoramic field of view. The equirectangular projection may have a slightly distorted representation of the captured video. For example, when the video is viewed by the user with the playback device 54, the captured video may appear as the panoramic field of view (e.g., an immersive video). In the example shown, the captured video may be an aerial view. A window 120, a window 122 and a window 124 are shown. The window 122 may be slightly larger than the window 124.

The window 124 may be the region of interest. For example, the region of interest 124 may be the portion of the panoramic video frame displayed on the playback device 54. The window 122 may be an additional area surrounding the region of interest 124. The additional area 122 may be next to the region of interest 124. The window 120 may represent a remaining area of the signal VIDEO (e.g., a region outside the region of interest 124 and/or the additional area 122). The size and/or amount of pixels comprising the remaining area 120, the additional area 122 and/or the region of interest 124 may be varied according to the design criteria of a particular implementation.

The apparatus 100 may be configured to encode a target area of the upcoming video frames of the signal VIDEO using the high quality compression. The apparatus 100 may be configured to encode other portions of the signal VIDEO using a low quality compression. In some embodiments, the apparatus 100 may encode the signal VIDEO using additional (e.g., intermediate) quality compressions.

In one example, the target area (e.g., the area using the parameters for the high quality compression) may be the additional area 122 and the region of interest 124. The remaining area 120 may be encoded using the parameters for the low quality compression. In another example, the target area may be the region of interest 124 and the remaining area 120 and the additional area 122 may be encoded using the low quality compression. In yet another example, the region of interest 124 may be encoded using the parameters for the high quality compression, the additional area 122 may be encoded using parameters for the intermediate quality compression and the remaining area 120 may be encoded using the parameters for low quality compression. The panoramic video may comprise the remaining area 120, the additional area 122 and the region of interest 124.

The region of interest 124 may be moved relative to the panoramic field of view based on the signal ROI_COR. Similarly, the additional area 122 and the remaining area 120 may be moved. In some embodiments, the additional area 122 may surround the region of interest 124. For example, the additional area 122 may be a border having a predetermined number of pixels around the region of interest 124. The size of the additional area 122 may be determined based on user input. For example, the size of the additional area 122 may be a number of pixels that an average user usually moves (e.g., by turning his or her head) when viewing the signal VIDEO. In another example, the size of the additional area 122 may be based on practical limitations (e.g., an amount of bandwidth available, a processing capability of the apparatus 100 and/or the playback device 54, etc.). In yet another example, the size of the additional area 122 may be based on a preference of the pilot 82 (e.g., a user configuration). The size of the additional area 122 may be varied according to the design criteria of a particular implementation.

When the pilot 82 makes a small change in head position, the image quality shown on the display 54 will remain high. The additional area 122 may implement a high quality region that may be larger than the displayed image of the region of interest 124. For example, the playback device 54 may refresh the displayed region of interest in response to head movements and when the display of the playback device 54 is refreshed to the additional area 122, the quality of the section of the panoramic video seen by the pilot 82 may remain high quality. The difference in size between the additional area 122 and the region of interest 124 may be configured to accommodate small head movements. For example, the additional area 122 may act as a buffer for the region of interest 124.

When the user makes large changes in head position (less common), the image quality on the display 54 may drop for a short time until the new center (e.g., coordinates) for the region of interest 124 is updated (e.g., the signal ROI_COR is sent to the apparatus 100 via the network 56) and the encoded settings change accordingly (e.g., the updated signal VIDEO is sent). The latency on the network 56 may impact the image quality for a short time (e.g., in the less common cases where the user makes large head movements). In many cases, when the apparatus 100 is implemented the latency on the network 56 may not impact the image quality and/or latency at all.

Figure 5:
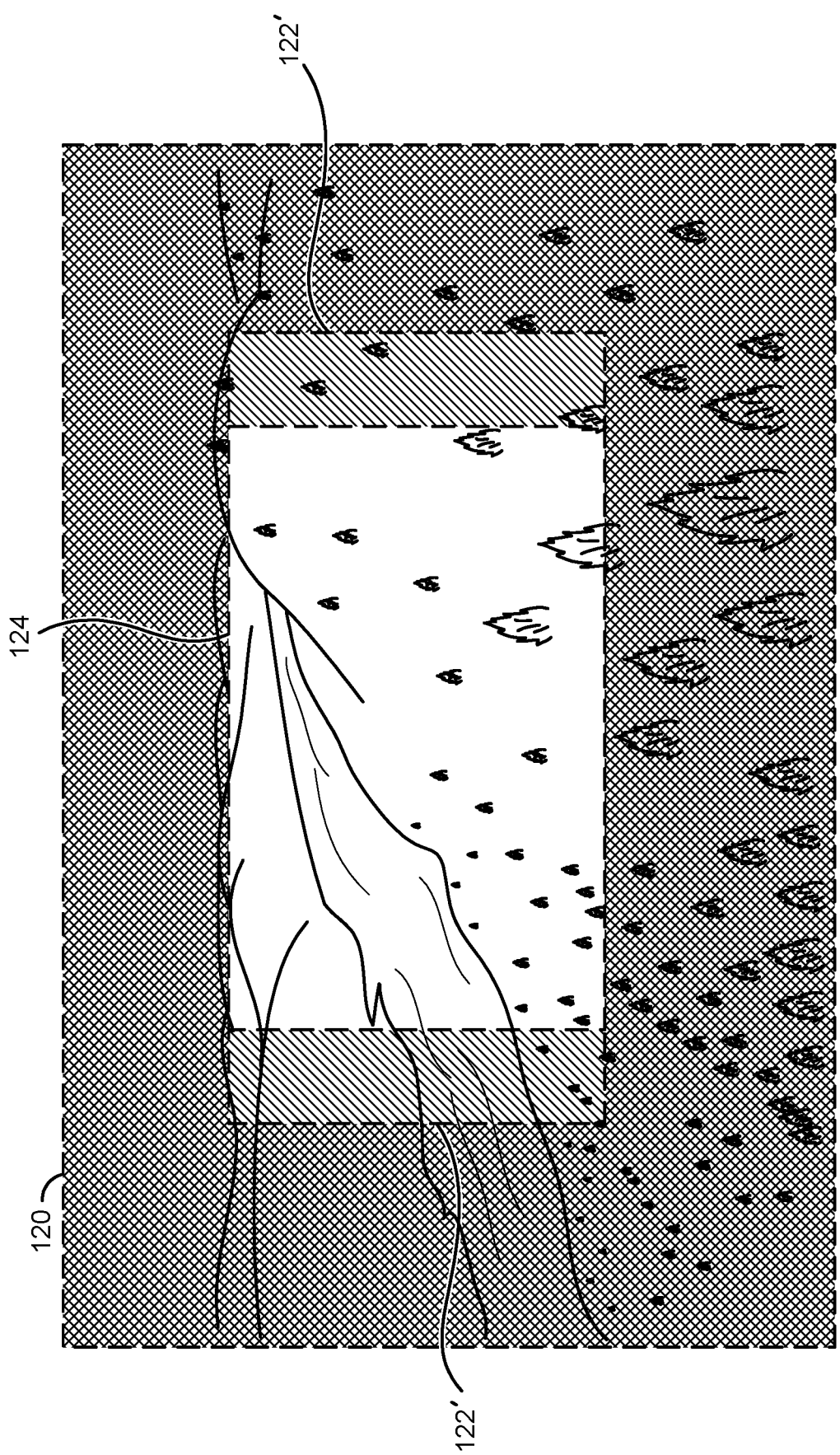
FIG. 5 is a diagram of an alternate sample portion of video.

Referring to FIG. 5, a diagram of an alternate sample portion of the signal VIDEO is shown. The equirectangular projection of the panoramic field of view may have various arrangements of the remaining area 120, the additional area 122' and/or the region of interest 124. The arrangement of the remaining area 120, the additional area 122' and/or the region of interest 124 may be based on user preferences, practical limitations (e.g., processing capability of the apparatus 100, the playback device 54, network speed, etc.), and/or expected use of the signal VIDEO (e.g., the type of input the user is expected to provide).

In the example shown, the region of interest 124 may be similar to the region of interest 124 shown in FIG. 4. The region of interest 124 may be encoded using the parameters for the high quality compression. The remaining area 120 may be encoded using the parameters for the low quality compression. The additional area 122' may be encoded using the parameters for the high quality compression (e.g., the additional area 122' may be part of the target area). In some embodiments, the additional area 122' may be encoded using the parameters for the intermediate quality compression.

The additional area 122' is shown as two segments of the signal VIDEO next to the region of interest 124. In the example shown, the additional area 122' is shown as a portion of the signal VIDEO to the left of the region of interest 124 and a portion of the signal VIDEO to the right of the region of interest 124. In some embodiments, the additional area 122' may be a portion of the signal VIDEO above the region of interest 124 and a portion of the signal VIDEO below the region of interest 124. For example, the additional area 122' may not surround the region of interest 124 as a continuous segment. The width and/or height of the additional area 122' may be varied according to the design criteria of a particular implementation.

In some embodiments, the additional area 122' may be selected based on an expected input from the pilot 82. For example, the signal VIDEO captured by the camera 52 may be a panoramic video of an aerial view. Since looking up in the aerial view may be of little interest (e.g., the user may see the sky above which may be considered uninteresting), the additional area 122' may be to the left, right and/or bottom of the region of interest 124. The expected input may be that the pilot 82 may turn his or her head to the left, right or bottom often and rarely look up. For example, the additional area 122' may be configured to cover a larger portion of the signal VIDEO to the left, right and/or bottom of the region of interest 124 than the additional area 122 (shown in FIG. 4) may cover to the left, right and/or bottom of the region of interest 124 without increasing the amount of bandwidth needed for transmission of the signal VIDEO.

Figure 6:
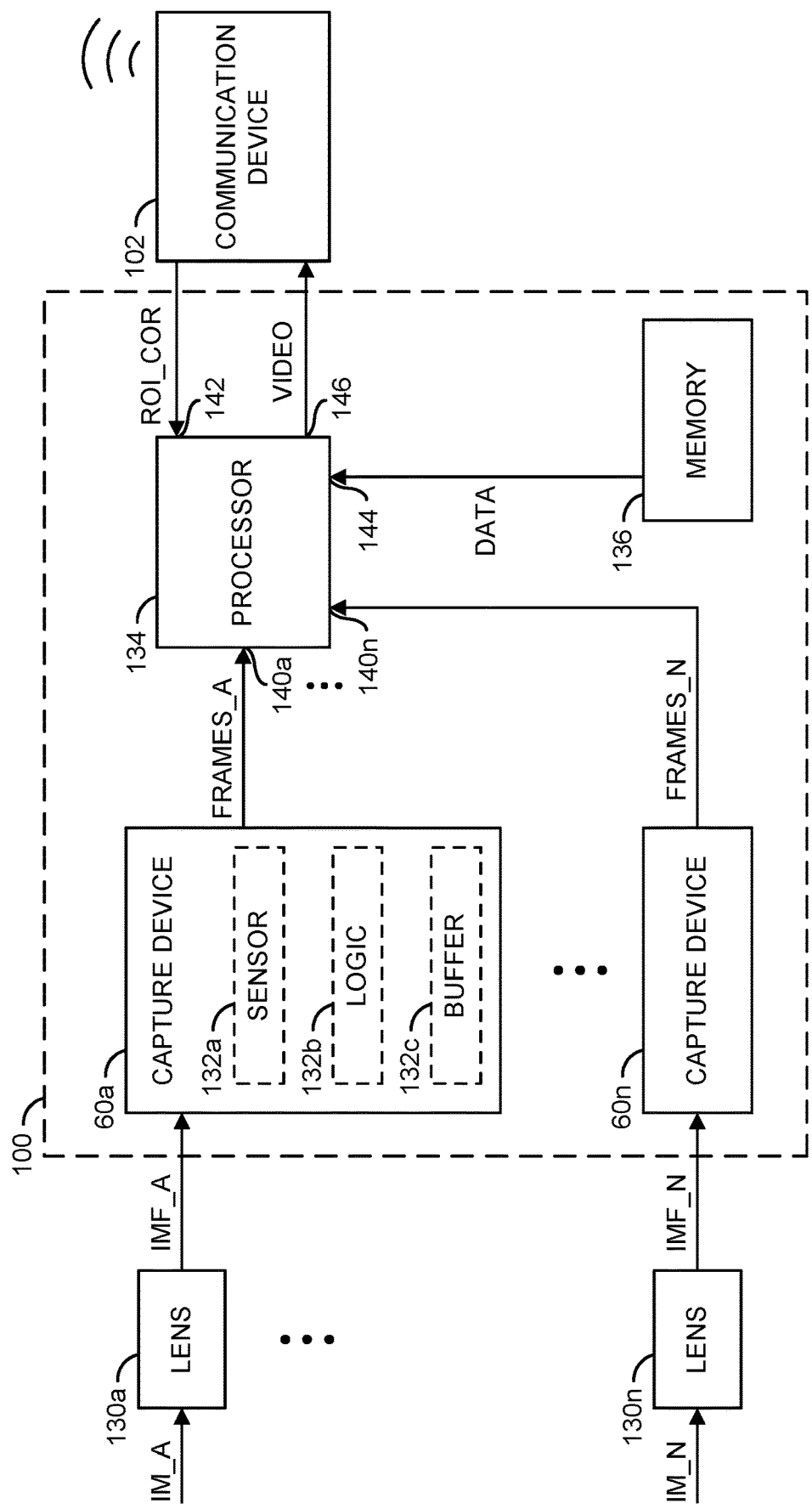
FIG. 6 is a block diagram illustrating an example embodiment of a system on chip for generating a panoramic video.

Referring to FIG. 6, a block diagram illustrating an example embodiment of the apparatus 100 generating a panoramic video is shown. The apparatus 100 generally comprises the capture devices 60a-60n, a block (or circuit) 134 and/or a block (or circuit) 136. The circuit 134 may be implemented as a processor. In an example implementation, the circuit 134 may be implemented as a video processor. The processor 134 may comprise inputs 140a-140n, an input 142, and input 144 and/or other inputs. The processor 134 may comprise an output 146 and/or other outputs. The circuit 136 may be implemented as a memory.

In the embodiment shown, the capture devices 60a-60n may be components of the apparatus 100. In some embodiments, the capture devices 60a-60n may be separate devices (e.g., part of the drone 72) configured to send data to the apparatus 100. Similarly, in some embodiments the wireless communication device 102 may be a component of the apparatus 100 and in some embodiments the wireless communication device 102 may be a separate device (e.g., part of the drone 72).

The apparatus 100 may receive one or more signals (e.g. IMF_A-IMF_N) and the signal ROI_COR. The apparatus 100 may present the signal VIDEO. The capture devices 60a-60n may receive the signals IMF_A-IMF_N from corresponding lenses 130a-130n. The apparatus 100 may receive the signal ROI_COR from the communication device 102. The apparatus 100 may present the signal VIDEO to the communication device 102. For example, the wireless communication device 102 may be a radio-frequency (RF) transmitter. In another example, the communication device 102 may be a Wi-Fi module. In another example, the communication device 102 may be a device capable of implementing RF transmission, Wi-Fi, Bluetooth and/or other wireless communication protocols.

The lenses 130a-130n may capture signals (e.g., IM_A-IM_N). The signals IM_A-IM_N may be an image (e.g., an analog image) of the environment near the drone 72 that is presented by the lenses 130a-130n to the capture devices 60a-60n as the signals IMF_A-IMF_N. The lenses 130a-130n may be implemented as an optical lens. The lenses 130a-130n may provide a zooming feature and/or a focusing feature. The capture devices 60a-60n and/or the lenses 130a-130n may be implemented, in one example, as a single lens assembly. In another example, the lenses 130a-130n may be a separate implementation from the capture devices 60a-60n. The capture devices 60a-60n are shown within the circuit 100. In an example implementation, the capture devices 60a-60n may be implemented outside of the circuit 100 (e.g., along with the lenses as part of a lens/capture device assembly).

The capture devices 60a-60n may be configured to capture image data for video (e.g., the signals IMF_A-IMF_N from the lenses 130a-130n). In some embodiments, the capture devices 60a-60n may be video capturing devices such as cameras. The capture devices 60a-60n may capture data received through the lenses 130a-130n to generate bitstreams (e.g., generate video frames). For example, the capture devices 60a-60n may receive focused light from the lenses 130a-130n. The lenses 130a-130n may be directed, tilted, panned, zoomed and/or rotated to provide a targeted view from the drone 72 (e.g., to provide coverage for a panoramic field of view). The capture devices 60a-60n may generate signals (e.g., FRAMES_A-FRAMES_N). The signals FRAMES_A-FRAMES_N may be video data (e.g., a sequence of video frames). The signals FRAMES_A-FRAMES_N may be presented to the inputs 140a-140n of the processor 134.

The capture devices 60a-60n may transform the received focused light signals IMF_A-IMF_N into digital data (e.g., bitstreams). In some embodiments, the capture devices 60a-60n may perform an analog to digital conversion. For example, the capture devices 60a-60n may perform a photoelectric conversion of the focused light received by the lenses 130a-130n. The capture devices 60a-60n may transform the bitstreams into video data, video files and/or video frames (e.g., perform encoding). In some embodiments, the video data generated by the capture devices 60a-60n may be analog video signals (e.g., raw data generated in response to the focused light from the lenses 130a-130n). In some embodiments, the video data may be digital video signals. The video signals may comprise video frames.

In some embodiments, the apparatus 100 may further comprise an audio capture device (e.g., a microphone). The audio capture device may capture audio of the environment. The apparatus 100 may be configured to synchronize the audio captured with the images captured by the capture devices 60a-60n.

The processor 134 may receive the signals FRAMES_A-FRAMES_N from the capture devices 60a-60n at the inputs 140a-140n, the signal ROI_COR from the communication device 102 at the input 142 and/or a signal (e.g., DATA) from the memory 136 at the input 144. The processor 134 may be connected through a bi-directional interface (or connection) to the capture devices 60a-60, to the communication device 102 and/or to the memory 136. The processor 134 may store and/or retrieve data from the memory 136. The memory 136 may be configured to store computer readable/executable instructions (or firmware). The instructions, when executed by the processor 134 may perform a number of steps.

The processor 134 may be configured to receive the signals FRAMES_A-FRAMES_N, the signal ROI_COR, the signal DATA and/or other inputs. The signal FRAMES_A-FRAMES_N may comprise video data (e.g., one or more video frames) providing a field of view captured by the lenses 130a-130n. The processor 134 may be configured to generate the signal VIDEO and/or other signals (not shown). The signal VIDEO may be generated based on one or more decisions made and/or functions performed by the processor 134. The decisions made and/or functions performed by the processor 134 may be determined based on data received by the processor 134 at the inputs 140a-140n (e.g., the signals FRAMES_A-FRAMES_N), the input 142, the input 144 and/or other inputs.

The inputs 140a-140n, the input 142, the input 144, the output 146 and/or other inputs/outputs may implement an interface. The interface may be implemented to transfer data to/from the processor 134, the communication device 102, the capture devices 60a-60n, the memory 136 and/or other components of the apparatus 100 and/or the drone 72. In one example, the interface may be configured to receive (e.g., via the inputs 140a-140n) the video streams FRAMES_A-FRAMES_N each from a respective one of the capture devices 60a-60n. In another example, the interface may be configured to receive (e.g., via the input 142) data from the playback device 54 (e.g., via the communication device 102) to determine a region of interest (e.g., the signal ROI_COR). In yet another example, the interface may be configured to output one or more upcoming video frames of the encoded panoramic video stream (e.g., the signal VIDEO) to the communication device 102. The interface may be configured to enable transfer of data and/or translate data from one format to another format to ensure that the data transferred is readable by the intended component. In an example, the interface may comprise a data bus, traces, connectors, wires and/or pins. The implementation of the interface may be varied according to the design criteria of a particular implementation.

The signal VIDEO may be presented to the communication device 102. The signal VIDEO may be an encoded, cropped and/or stitched version of one or more of the signals FRAMES_A-FRAMES_N. To enable the pilot 82 to react to the real world location of the drone 72, the signal VIDEO may be generated with low-latency path (e.g., there may be little delay in generating the signal VIDEO to prevent lag). For example, since the remaining area 120 may be unlikely to be seen by the pilot 82 encoding of some of the signals FRAMES_A-FRAMES_N may be skipped and/or ignored to decrease an amount of time needed to generate the signal VIDEO. The signal VIDEO may be a high resolution, digital, encoded, stabilized, cropped, blended, stitched and/or rolling shutter effect corrected version of the signals FRAMES_A-FRAMES_N. In some embodiments, the apparatus 100 may be configured to balance an amount of time needed to generate the signal VIDEO with the visual quality of the signal VIDEO.

The apparatus 100 may implement a camera system. In some embodiments, the camera system 100 may be implemented as a drop-in solution (e.g., installed as one component). In an example, the camera system 100 may be a device that may be installed as an after-market product for the drone 72 (e.g., a retro-fit for the drone 72). The number and/or types of signals and/or components implemented by the camera system 100 may be varied according to the design criteria of a particular implementation.

The video data of the targeted view from the drone 72 may be represented as the signals/bitstreams/data FRAMES_A-FRAMES_N (e.g., video signals). The capture devices 60a-60n may present the signals FRAMES_A-FRAMES_N to the inputs 140a-140n of the processor 134. The signals FRAMES_A-FRAMES_N may represent the video frames/video data. The signals FRAMES_A-FRAMES_N may be video streams captured by the capture devices 60a-60n. In some embodiments, the capture devices 60a-60n may be implemented in a camera. In some embodiments, the capture devices 60a-60n may be configured to add to existing functionality of a camera.

The capture devices 60a-60n may comprise blocks (or circuits) 132a-132c. The circuit 132a may implement a camera sensor (e.g., a complementary metal-oxide-semiconductor (CMOS) sensor). The circuit 132b may implement a camera processor/logic. The circuit 132c may implement a memory buffer. The camera sensor 132a may receive light from the corresponding one of the lenses 130a-130n and transform the light into digital data (e.g., the bitstreams).

For example, the camera sensor 132a of the capture device 60a may perform a photoelectric conversion of the light from the lens 130a. The logic 132b may transform the bitstream into a human-legible content (e.g., video data). For example, the logic 132b may receive pure (e.g., raw) data from the camera sensor 132a and generate video data based on the raw data (e.g., the bitstream). The memory buffer 132c may store the raw data and/or the processed bitstream. For example, the frame memory and/or buffer 132c may store (e.g., provide temporary storage and/or cache) one or more of the video frames (e.g., the video signal).

The apparatus 100 may further comprise an interface (not shown) configured to receive data from one or more components of the drone 72, the pilot 82 and/or other components of the camera system 100. The interface may be configured to send data (e.g., instructions) from the processor 134 to the components of the drone 72. For example, the interface may be bi-directional. In an example, data presented to the interface may be used by the processor 134 to determine the movement of the drone 72 (e.g., to provide information to perform image stabilization).

The interface may receive information from a gyroscope sensor, information from an inertial measurement unit, information from one or more components of the drone 72, etc. In an example, the information from the components of the drone 72 may be used to calculate telemetry data that may be compared to telemetry information calculated by the processor 134 by analyzing the video data captured (e.g., detected and/or measuring the horizon captured in the video data). The type of data and/or the number of components of the drone 72 that provide data may be varied according to the design criteria of a particular implementation.

The processor 134 may be configured to execute computer readable code and/or process information. The processor 134 may be configured to receive input and/or present output to the memory 136. The processor 134 may be configured to present and/or receive other signals (not shown). The number and/or types of inputs and/or outputs of the processor 134 may be varied according to the design criteria of a particular implementation.

The processor 134 may receive the signals FRAMES_A-FRAMES_N, the signal ROI_COR and/or the signal DATA. The processor 134 may make a decision based on data received at the inputs 140a-140n, the input 142, the input 144 and/or other input. For example other inputs may comprise external signals generated in response to user input, external signals generated by the drone 72 and/or internally generated signals such as signals generated by the processor 134 in response to analysis of the signals FRAMES_A-FRAMES_N and/or objects detected in the signals FRAMES_A-FRAMES_N. The processor 134 may adjust the video data (e.g., crop, digitally move, physically move the camera sensor 132a, etc.) of the signals FRAMES_A-FRAMES_N. The processor 134 may generate the signal VIDEO in response data received by the inputs 140a-140n, the input 142, the input 144 and/or the decisions made in response to the data received by the inputs 140a-140n, the input 142 and/or the input 144.

The signal VIDEO may be generated to provide an output for the communication device 102 in response to the captured video frames (e.g., the signal FRAMES_A-FRAMES_N) and the region of interest data (e.g., the signal ROI_COR). For example, the input ROI_COR may be sent to the processor 134 (via an optional interface) in order to provide coordinates of where they pilot 82 is looking. The processor 134 may present the signal VIDEO to the communication device 102 in real-time and/or near real-time (e.g., with minimal delay). The signal VIDEO may be a live (or nearly live) video stream. The signal VIDEO may be transmitted to the playback device 54 (e.g., using RF communication) to provide the pilot 82 with a panoramic view from the perspective of the drone 72 that is representative of the current field of view captured by the lenses 130a-130n.

Generally, the signal VIDEO may correspond to the data received at the inputs 140a-140n, the input 142, the input 144 and/or analyzed (e.g., stabilized, corrected, cropped, downscaled, packetized, compressed, etc.) by the processor 134. For example, the signal VIDEO may be a stitched, corrected, stabilized, cropped and/or encoded version of the signals FRAMES_A-FRAMES_N that may be generated fast enough to allow the pilot 82 to react quickly to the environment. The processor 134 may further encode and/or compress the signals FRAMES_A-FRAMES_N to generate the signal VIDEO. In some embodiments, downscaling of portions of the panoramic video (e.g., the remaining area 120) may be performed in parallel with the encoding of the high quality portions of the panoramic video (e.g., the region of interest 124 and/or the additional area 122).

The cropping, downscaling, blending, stabilization, packetization, encoding, compression and/or conversion performed by the processor 134 may be varied according to the design criteria of a particular implementation. For example, the signal VIDEO may be a processed version of the signals FRAMES_A-FRAMES_N configured to fit the target area to the shape and/or specifications of the playback device 54 and/or to emulate a view from perspective of the drone 72. For example, the playback device 54 may be implemented for real-time video streaming of the signal VIDEO received from the apparatus 100.

Generally, the signal VIDEO is some view (or derivative of some view) captured by the capture devices 60a-60n. In some embodiments, the signal VIDEO may provide a series of panoramic video frames that improves upon the view from the perspective of the drone 72 (e.g., provides night vision, provides High Dynamic Range (HDR) imaging, provides more viewing area, highlights detected objects, provides additional data such as a numerical distance to detected objects, provides visual indicators for paths of a race course, etc.).

The memory 136 may store data. The memory 136 may be implemented as a cache, flash memory, DRAM memory, etc. The type and/or size of the memory 136 may be varied according to the design criteria of a particular implementation. The data stored in the memory 136 may correspond to a video file, status information (e.g., readings from the components of the drone 72, pre-selected fields of view, user preferences, user inputs, etc.) and/or metadata information.

The communication device 102 may send and/or receive data to/from the apparatus 100. In some embodiments, the communication device 102 may be implemented as a wireless communications module. In some embodiments, the communication device 102 may be implemented as a satellite connection to a proprietary system. In one example, the communication device 102 may be a hard-wired data port (e.g., port, a mini-USB port, a USB-C connector, HDMI port, an Ethernet port, a DisplayPort interface, a Lightning port, etc.). In another example, the communication device 102 may be a wireless data interface (e.g., Wi-Fi, Bluetooth, ZigBee, cellular, etc.).

The lenses 130a-130n (e.g., camera lenses) may be directed to provide a panoramic view from the drone 72. The lenses 130a-130n may be aimed to capture environmental data (e.g., light). The lens 130a-130n may be configured to capture and/or focus the light for the capture devices 60a-60n. Generally, the camera sensor 132a is located behind each of the lenses 130a-130n. Based on the captured light from the lenses 130a-130n, the capture devices 60a-60n may generate a bitstream and/or video data.

Data from the components of the drone 72 may be presented to the apparatus 100. The number and/or types of the components of the drone 72 may be varied according to the design criteria of a particular implementation. The data from the components of the drone 72 may be used by the camera system 100 to determine a movement direction of the drone 72. In one example, location-related information may be determined by a location module (e.g., to determine weather conditions for the current location of the drone 72). For example, the location module may be implemented as a GPS sensor. Orientation information may be determined by an orientation module. For example, the orientation module may be implemented as a magnetometer, an accelerometer and/or a gyroscope. In yet another example, temperature information may be determined by a temperature module. For example, the temperature module may be implemented as a thermometer. The types of the components of the drone 72 used to implement the location module, the orientation module, the temperature module and/or any other types of sensors may be varied according to the design criteria of a particular implementation.

Different communication channels may be implemented to transmit video and drone control. In an example, the communication module 102 may implement one communication channel to transmit video and a different communication channel for drone control (e.g., movements input by the pilot 82 using the remote control 74). In another example, the drone 72 may comprise the communication module 102 to implement one channel to transmit the signal VIDEO and receive the signal ROI_COR and a separate remote-control (RC) transmitter to implement a different channel for drone control (e.g., the signal CTRL). Example frequencies may comprise 900 MHz, 1.2 GHz, 2.4 GHz and/or 5.8 GHz. In an example, if the drone 72 uses a RC transmitter on one of the frequencies for control, then, in order to avoid interference, another one of the frequencies should be selected for the communication module 102. In some embodiments, an option may be provided to select a sub-frequency for each pilot. In some embodiments, the wireless communication module 102 may automatically select a sub-frequency for each pilot. For example, many video transmitters operate at 5.8 GHz. Other frequencies may be implemented. The channels used for a particular type of communication (e.g., video, region of interest data or control) and/or the frequencies used may be varied according to the design criteria of a particular implementation.

Embodiments of the apparatus 100 may perform video stitching operations on the signals FRAMES_A-FRAMES_N. In one example, each of the video signals FRAMES_A-FRAMES_N may provide a portion of a panoramic view and the processor 134 may crop, blend, synchronize and/or align the signals FRAMES_A-FRAMES_N to generate the panoramic video signal VIDEO. In some embodiments, the processor 134 may be configured to perform electronic image stabilization (EIS). The processor 134 may encode the signals FRAMES_A-FRAMES_N to a particular format.

The processor 134 may downscale the signals FRAMES_A-FRAMES_N to reduce a bandwidth needed to transmit the signal VIDEO. The processor 134 may use the signal ROI_COR to blend a high quality portion (e.g., using one or more of the signals FRAMES_A-FRAMES_N) to be used as the target area (e.g., the additional area 122 and/or the region of interest 124). The panoramic video generated by the processor 134 may be sent to the output 146 (e.g., the signal VIDEO). In one example, the signal VIDEO may be an HDMI output. In another example, the signal VIDEO may be a composite (e.g., NTSC) output (e.g., composite output may be a low-cost alternative to HDMI output). In yet another example, the signal VIDEO may be a S-Video output. The panoramic video signal VIDEO may be output to the wireless communication device 102. In an example, the wireless communication device 102 may be a RF transmitter.

The video generated by the processor 134 may also be used to implement a panoramic video having high-quality video in the region of interest 124 and/or the additional area 122 (e.g., the target area). The video generated by the processor 134 may be used to implement a panoramic video that reduces bandwidth needed for transmission by having a low-quality video in the remaining area 120. To generate the high-quality video and the low-quality video portions of the panoramic video, the processor 134 may be configured to perform encoding, blending, cropping, aligning and/or stitching.

The encoded video may be stored locally and/or transmitted wirelessly to external storage (e.g., network attached storage, cloud storage, etc.). In an example, the encoded, panoramic video may be stored locally by the memory 136. In another example, the encoded, panoramic video may be stored to a hard-drive of a networked computing device. In yet another example, the encoded, panoramic video may be transmitted wirelessly without storage. The type of storage implemented may be varied according to the design criteria of a particular implementation.

The processor 134 may be configured to send analog and/or digital video out (e.g., the signal VIDEO) to the video communication device 102. In some embodiments, the signal VIDEO generated by the apparatus 100 may be a composite and/or HDMI output. The processor 134 may receive an input for the video signal (e.g., the signals FRAMES_A-FRAMES_N) from the CMOS sensor 132a and an input from the communication device 102 (e.g., the signal ROI_COR transmitted from the playback device 54) to determine the target area. For example, the region of interest data may be used by the processor 134 to determine the coordinates of where the pilot 82 is currently looking in order to determine corresponding coordinates for the target area in the upcoming frames of the panoramic video signal VIDEO. In another example, the signal ROI_COR may be used by the processor 134 to determine specifications of the playback device 54 (e.g., a playback resolution, a viewport, an aspect ratio, supported decoders, etc.). The input video signals FRAMES_A-FRAMES_N may be processed by the processor 134 (e.g., color conversion, noise filtering, auto exposure, auto white balance, auto focus, etc.) and then stabilized by the processor 134.

Figure 7:
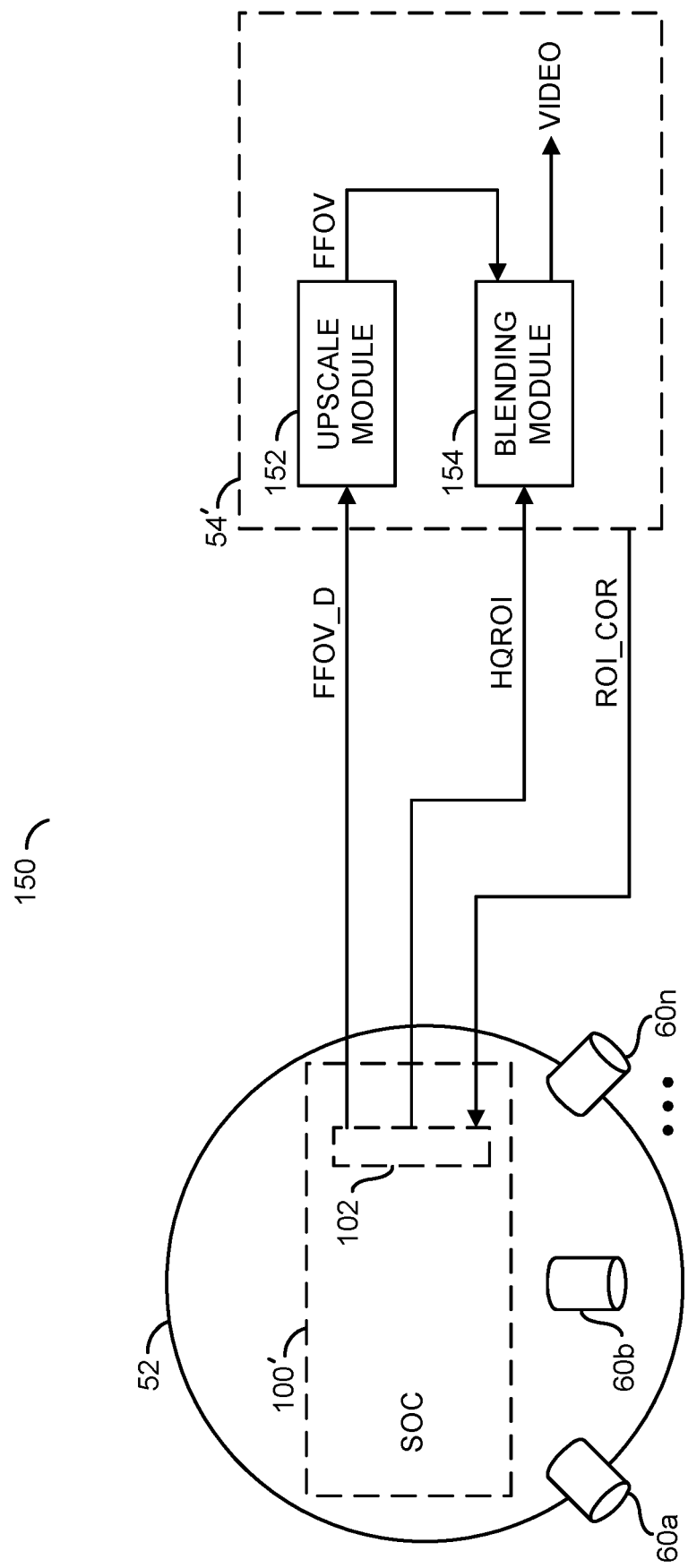
FIG. 7 is a diagram illustrating an alternate embodiment for transmitting a downscaled panoramic video and a high quality region of interest.

Referring to FIG. 7, a diagram illustrating an alternate embodiment 150 for transmitting a downscaled panoramic video and a high quality region of interest is shown. The alternate embodiment 150 may comprise the camera 52 and the playback device 54'. In the embodiment 150, the playback device 54' may be configured to perform upscaling and/or blending. In an example, using the playback device 54' for upscaling and/or blending instead of the apparatus 100' may reduce an amount of power consumption and/or heat generated by the drone 72.

The camera 52 is shown comprising the capture devices 60a-60n, the apparatus 100' and/or the communication device 102. In some embodiments, the communication device 102 may be a component of the apparatus 100'. In some embodiments, the communication device 102 may be a component separate from the apparatus 100' (e.g., the communication device 102 may be a component of the drone 72). The apparatus 100' may be configured to generate a signal (e.g., FFOV_D) and a signal (e.g., HQROI). The apparatus 100' may be configured to receive the signal ROI_COR. The signal FFOV_D, the signal HQROI and the signal ROI_COR may be transmitted and/or received using the communication device 102. Other signals may be transmitted between the camera 52 and the playback device 54' (not shown). The number and/or types of signals may be varied according to the design criteria of a particular implementation.

The playback device 54' may comprise a block (or circuit) 152 and/or a block (or circuit) 154. The circuit 152 may implement an upscale module. The circuit 154 may implement a blending module. The upscale module 152 may receive the signal FFOV_D. The upscale module 152 may generate a signal (e.g., FFOV). The blending module may receive the signal HQROI and/or the signal FFOV. The blending module may generate the signal VIDEO. The playback device 54' may comprise other components (not shown). For example, one of the other components of the playback device 54' may be a communication device. In another example, one of the other components of the playback device 54' may be a decoder. The number, layout and/or functionality of the components of the playback device 54' may be varied according to the design criteria of a particular implementation.

The signal FFOV_D may be a full panoramic video signal. The apparatus 100' may be configured to perform video stitching operations on the signals FRAMES_A-FRAMES_N and perform downscaling to generate the signal FFOV_D. In the embodiment 150, the apparatus 100' may downscale the full field of view of the panoramic video signal (e.g., the remaining area 120, the additional area 122 and the region of interest 124).

The signal HQROI may be a cropped portion of a panoramic video signal. The apparatus 100' may be configured to crop a portion of one or more of the signals FRAMES_A-FRAMES_N corresponding to the target area (e.g., the additional area 122 and/or the region of interest 124 determined based on the signal ROI_COR). The apparatus 100' may be configured to process, analyze, filter, encode and/or compress the portion of the signals FRAMES_A-FRAMES_N to generate the signal HQROI. The signal HQROI may have a higher visual quality than the signal FFOV_D. For example, the signal HQROI may be used for the playback of the region of interest viewed by the pilot 82 on the playback device 54.

The signal FFOV_D and the signal HQROI may be streamed together. For example, the signal FFOV_D may represent one full panoramic video frame and the signal HQROI represent a portion of the same panoramic video frame. The signal FFOV_D and the signal HQROI may be synchronized such that the video data in the video frames correspond to a same time of capture by the capture devices 60a-60n. The signal FFOV_D and the signal HQROI may be transmitted as two separate streams of data. Sending the signal FFOV_D and the signal HQROI as separate streams of data may reduce a workload on the apparatus 100' (e.g., reduced battery drain, reduced time to generate the panoramic video, reduced heat generated, etc.).

The upscale module 152 may be configured to upscale the signal FFOV_D. In an example, the upscale module 152 may upscale the signal FFOV_D to a resolution and/or pixel density corresponding to the playback capability (e.g., specifications) of the playback device 54'. The signal FFOV may be the upscaled version of the signal FFOV_D. The signal FFOV may be transmitted to the blending module 154. The implementation of the upscaling may be varied according to the design criteria of a particular implementation.

The blending module 154 may be configured to blend the portion of the panoramic video HQROI with the upscaled full panoramic video signal FFOV. Blending the signal HQROI with the signal FFOV may generate a panoramic video having a higher visual quality in the target area (e.g., the region of interest 124 and/or the additional area 122) than in the remaining area 120. For example, the target area may be a blend of the signal HQROI and the signal FFOV and the remaining area 120 may be the signal FFOV. The blending of the signal HQROI and the signal FFOV may generate the signal VIDEO. The blending module 154 may generate the signal VIDEO to be output (e.g., displayed) to the pilot 82. The implementation of the blending may be varied according to the design criteria of a particular implementation.

Figure 8:
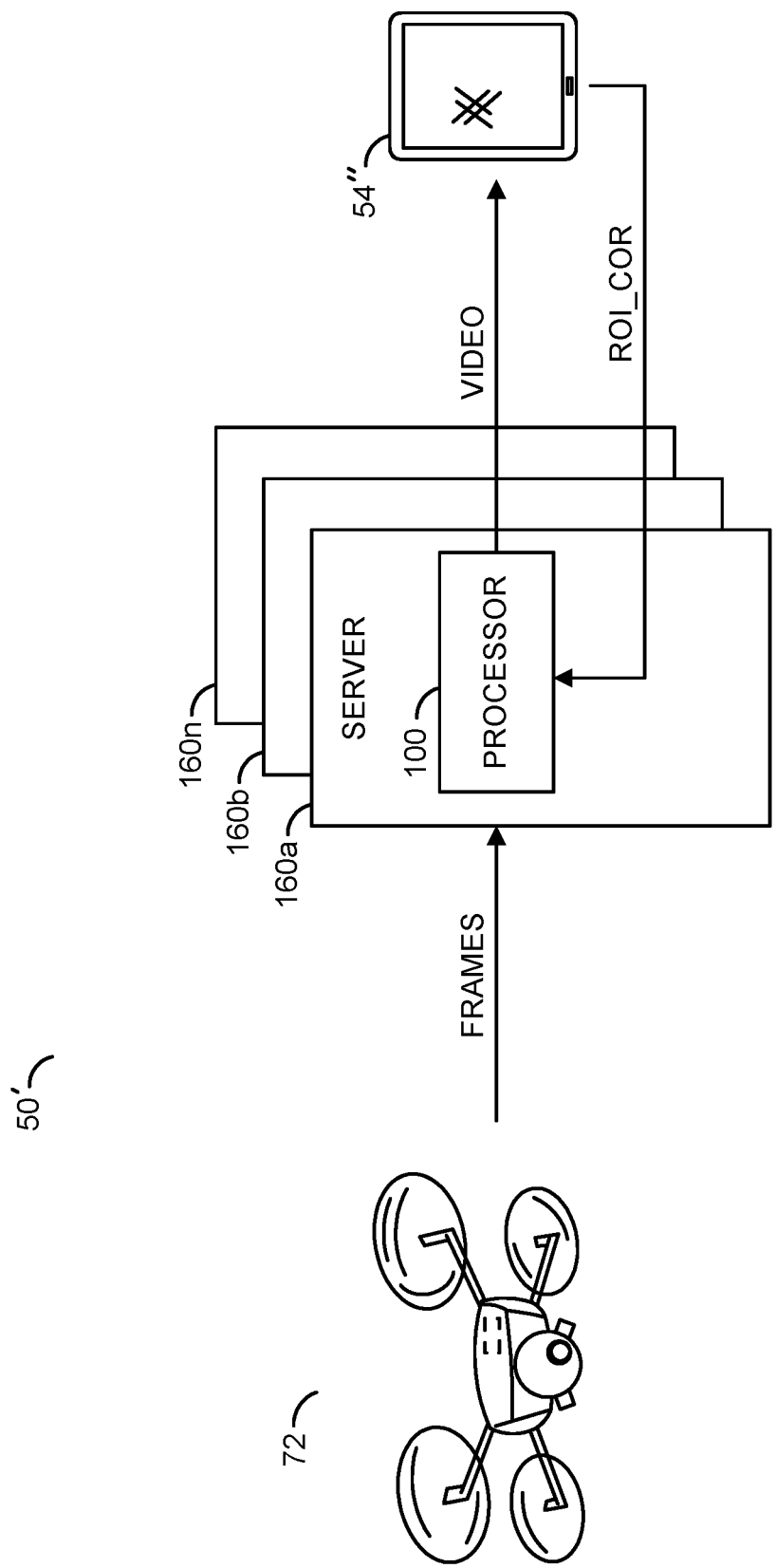
FIG. 8 is a diagram illustrating an alternate server-based implementation.

Referring to FIG. 8, an alternate server-based implementation 50' is shown. The apparatus 100 may be implemented as a peer-to-peer network topology. In some embodiments, the apparatus 100 may be implemented in a client-server network topology. In an example, the client-server network implementation 50' may be implemented when a viewer is not the pilot 82. For example, the user may remotely view the images and not control the drone. In an example, the client-server network system 50' may be implemented when the view from the perspective of the drone 72 may not be time-sensitive (e.g., the latency between the drone 72, a server and/or the viewer is not a constraint).

The system 50' may comprise the drone 72, servers 160a-160n and/or the playback device 54". The playback device 54" is shown as a tablet computing device. The system 50' may comprise additional components. One or more of the servers 160a-160n may connect the endpoints (e.g., the drone 72 and the playback device 54"). In an example, the servers 160a-160n may implement an internet connection between the endpoints. The system 50' shows the apparatus 100 implemented on the server 160a. Similarly, each of the servers 160a-160n may implement the apparatus 100. In an example, the servers 160a-160n may be implemented as a group of cloud-based scalable servers. By implementing a number of scalable servers 160a-160n, the apparatus 100 may have additional resources (e.g., power, processing capability, memory, etc.) available to process variable amounts of data from the camera 52. For example, the servers 160a-160n may be configured to scale (e.g., provision resources) based on demand. In some embodiments, the server 160a may be configured to implement the apparatus 100 and the servers 160b-160n may be configured as a content delivery network (CDN).

The drone 72 may capture the video data (e.g., using the camera 52). The drone 72 may transmit a signal (e.g., FRAMES). The signal FRAMES may comprise the signals FRAMES_A-FRAMES_N (e.g., video frames captured by each of the capture devices 60a-60n). In some embodiments, the signal FRAMES may be encoded at the full bitrate of the capture devices 60a-60n. In some embodiments, the signal FRAMES may be raw video data (e.g., uncompressed video data). For example, the signal FRAMES may be sent using a high bit-rate link (e.g., a content delivery network backhaul). In some embodiments, the apparatus 100 may generate the signal VIDEO based on the signal FRAMES. The apparatus 100 may generate the signal VIDEO having varying regions encoded at different bitrates (or amounts of lossiness). The signal VIDEO may be generated in response to the signal ROI_COR. The signal VIDEO and/or the signal ROI_COR may be transmitted using a low-rate link (e.g., a link that may be saturated by the signal FRAMES).

In some embodiments, the servers 160a-160n may be configured to stream the signal VIDEO to the playback device 54" (e.g., for live playback). For example, the servers 160a-160n may connect to the drone 72 using a high-rate link to receive the signal FRAMES. The apparatus 100 may perform operations to stitch, encode and/or transcode the signal FRAMES to generate the signal VIDEO in real-time (or near real-time). For example, the signal FRAMES may be a full (e.g., uncompressed), high-quality stream of the panoramic video from the drone 72 to the servers 160a-160n, and the signal VIDEO may be a panoramic version of the signal FRAMES having at least two sections with different qualities streamed from the servers 160a-160n to the playback device 54".

In some embodiments, the servers 160a-160n may be configured to receive the signal FRAMES and transfer the signal VIDEO to the playback device 54" for playback at a later time. For example, the signal FRAMES may be uploaded to the servers 160a-160n (e.g., via an internet connection, or locally from a storage device such as a USB drive, an external memory card, a hard drive, a flash drive, etc.). The signal FRAMES may be stored by the server 160a-160n until requested by the playback device 54" (e.g., not streamed live). The apparatus 100 may be configured to stitch, encode and/or transcode the signal FRAMES and store the stitched, encoded and/or transcoded result.

For example, the servers 160a-160n may store the source signal FRAMES (e.g., the full, high quality video version of the captured environment), and one or more versions of the signal FRAMES may be stitched, encoded and/or transcoded by the apparatus 100 (e.g., various lower-quality versions of the signal FRAMES). The apparatus 100 may transfer the stored signal VIDEO comprising the high quality portion for the region of interest and the lower-quality version of the entire panoramic video (e.g., to be used for areas outside the region of interest) based on information from the signal ROI_COR received from the playback device 54". The apparatus 100 may stream one video signal comprising the target area (e.g., the window 122 and/or the window 124) having a high quality and another video stream comprising the entire panoramic video stream having a low quality (e.g., to be used for the remaining area 120) and the playback device 54" may combine the streams for playback.

The camera 52 implementing the apparatus 100 may be configured to generate the signal FRAMES and/or the signal VIDEO. In some embodiments, where the camera 52 is used in a video streaming application, the camera 52 may generate the signal FRAMES to be stitched and/or transcoded by the apparatus 100 on the servers 160a-160n. In some embodiments, where the camera 52 is used for streaming, the apparatus 100 may stitch and/or transcode the captured video to locally (e.g., at the camera 52) generate the signal VIDEO for the playback device 54" (e.g., the camera 52 may be connected to the playback device 54"). In some embodiments, the camera 52 may be configured to generate the full quality panoramic source video FRAMES. The video FRAMES may be kept for storage. For example, the camera 52 may be connected to a storage device such as a flash storage card. The apparatus 100 may encode the signal FRAMES to generate the signal VIDEO at a later time.

Figure 9:
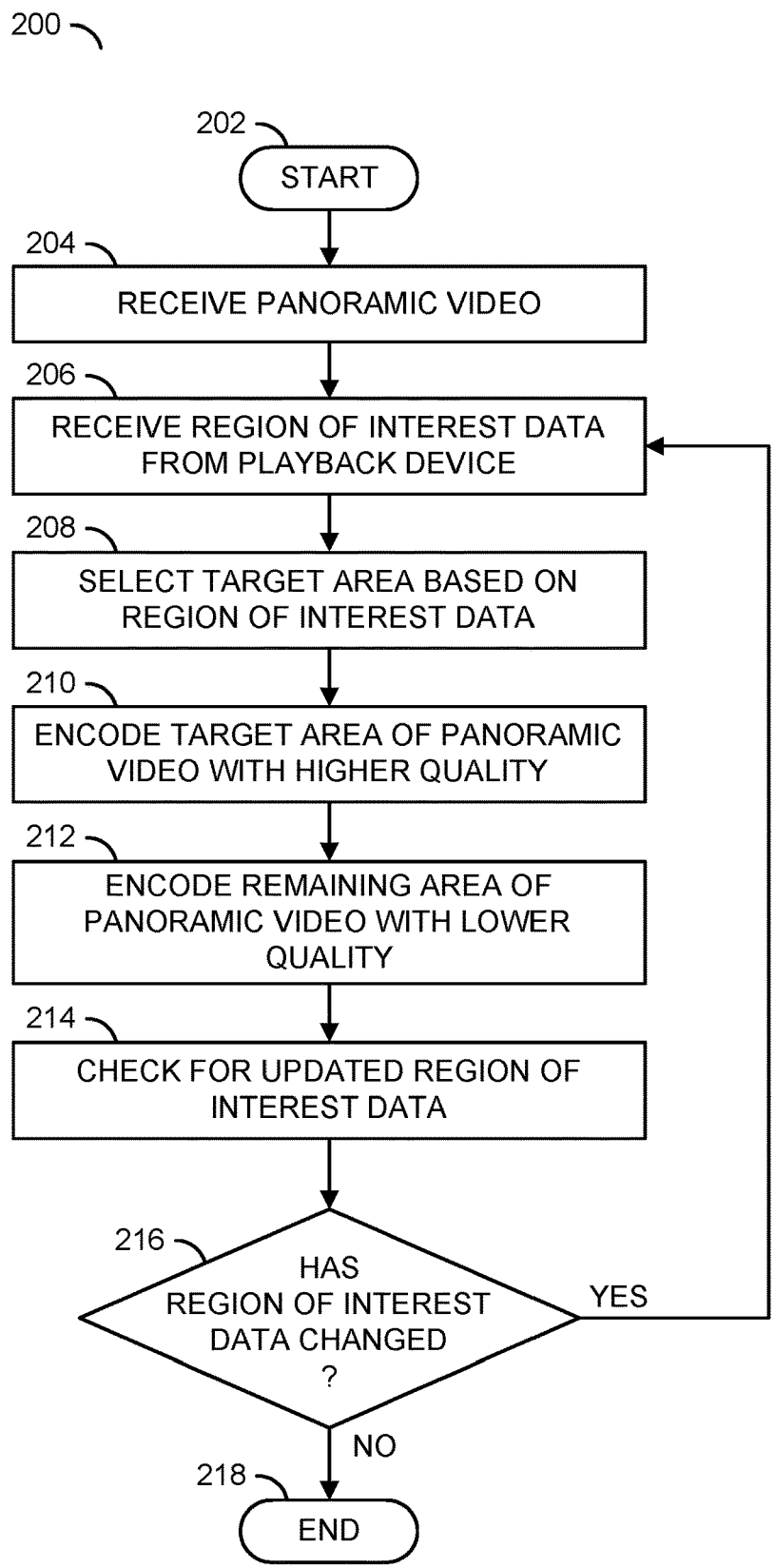
FIG. 9 is a flow diagram illustrating a method for encoding areas of a panoramic video based on a region of interest.

Referring to FIG. 9, a method (or process) 200 is shown. The method 200 may encode areas of a panoramic video based on a region of interest. The method 200 generally comprises a step (or state) 202, a step (or state) 204, a step (or state) 206, a step (or state) 208, a step (or state) 210, a step (or state) 212, a step (or state) 214, a decision step (or state) 216, and a step (or state) 218.

The state 202 may start the method 200. In the state 204, the apparatus 100 may receive the panoramic video (e.g., from the camera 52 and/or the capture devices 60a-60n). Next, in the state 206, the apparatus 100 may receive the region of interest data (e.g., the signal ROI_COR) from the playback device 54. In the state 208, the apparatus 100 (e.g., the processor 134) may select the target area based on the region of interest data for the upcoming frames of the encoded panoramic video. For example, the processor 134 may select the region of interest 124 as the target area. In another example, the processor 134 may select the region of interest 124 and the additional area 122 as the target area. Next, the method 200 may move to the state 210.

In the state 210, the processor 134 may encode the target area of the panoramic video with the higher quality. In the state 212, the processor 134 may encode the remaining area (e.g., the remaining area 120 when the target area comprises both the additional area 122 and the region of interest 124) with the lower quality. The processor 134 may transmit the video (e.g., the signal VIDEO) to the playback device 54 (e.g., using the communication device 102). In the state 214, the processor 134 may check for updated region of interest data (e.g., the signal ROI_COR received from the playback device 54 via the communication device 102). Next, the method 200 may move to the decision state 216.

In the decision state 216, the processor 134 may determine whether the region of interest has changed (e.g., based on the data in the signal ROI_COR). If the region of interest has changed, the method 200 may return to the state 206. If the region of interest has not changed, the method 200 may move to the state 218. The state 218 may end the method 200.

Figure 10:
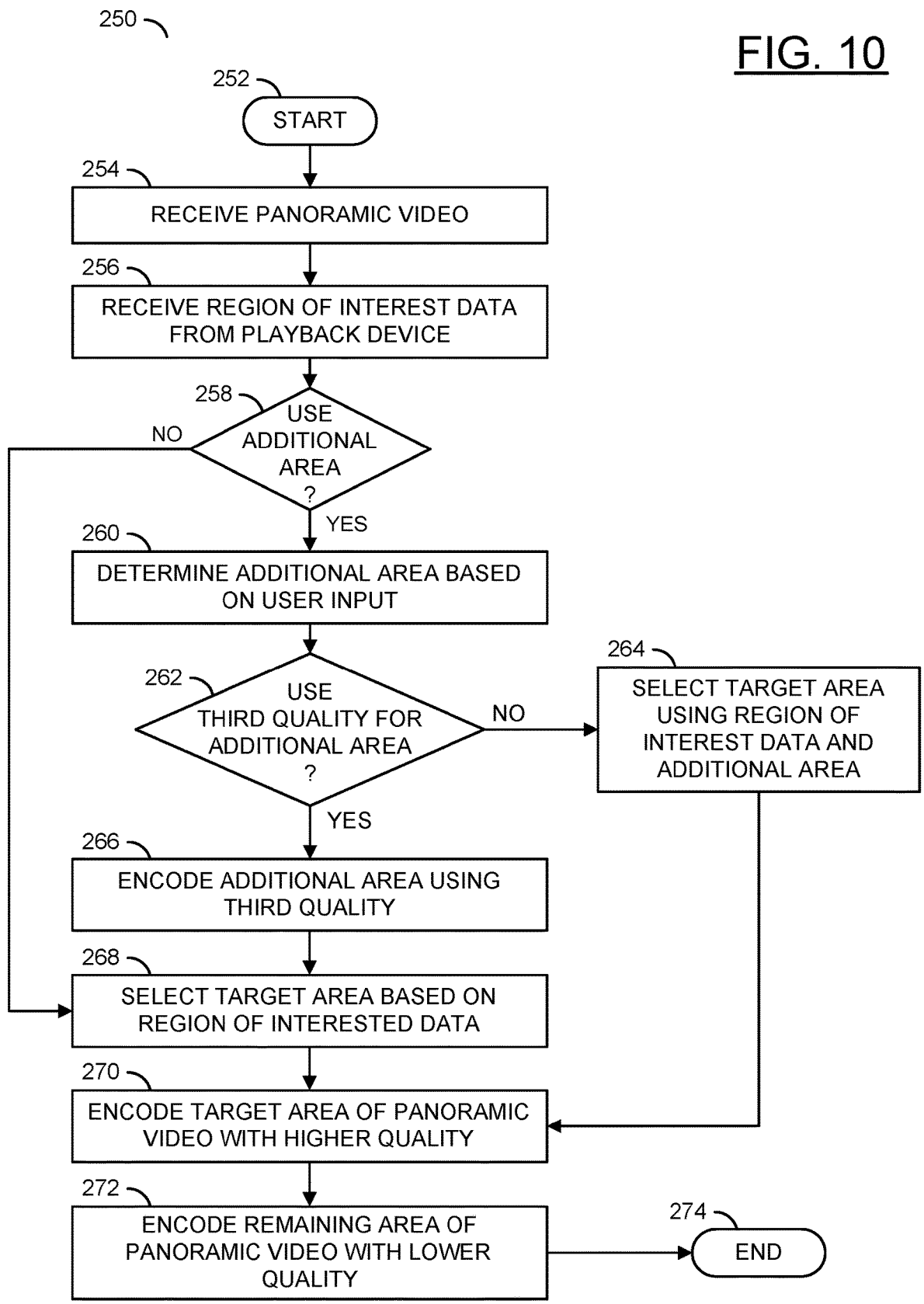
FIG. 10 is a flow diagram illustrating a method for encoding an additional area around a region of interest.

Referring to FIG. 10, a method (or process) 250 is shown. The method 250 may encode an additional area around a region of interest. The method 250 generally comprises a step (or state) 252, a step (or state) 254, a step (or state) 256, a decision step (or state) 258, a step (or state) 260, a decision step (or state) 262, a step (or state) 264, a step (or state) 266, a step (or state) 268, a step (or state) 270, a step (or state) 272, and a step (or state) 274.

The state 252 may start the method 250. In the state 254, the processor 134 may receive (or generate) the panoramic video. In some embodiments, the panoramic video may be received from the capture devices 60a-60n. In some embodiments, the processor 134 may perform video stitching operations on the signals FRAMES_A-FRAMES_N generated by the capture devices 60a-60n. In the state 256, the processor 134 may receive the region of interest data (e.g., the signal ROI_COR) from the playback device 54 (e.g., via the communication device 102). Next, the method 250 may move to the decision state 258.

In the decision state 258, the processor 134 may determine whether to use the additional area 122 as part of the target area. For example, a user setting may be selected to determine whether or not the additional area 122 should be part of the target area. If the additional area 122 is not used as the target area, the method 250 may move to the state 268. If the additional area 122 is used as part of the target area, the method 250 may move to the state 260. In the state 260, the processor 134 may determine the size of the additional area 122 for the upcoming frames of the panoramic video based on the user input (e.g., the average input by the pilot 82). For example, the average input may be an amount of movement corresponding to a small change to the region of interest. Next, the method 250 may move to the decision state 262.

In the decision state 262, the processor 134 may determine whether to use a third quality (e.g., one of the intermediate quality compressions) for the additional area 122. For example, a user setting may be selected to determine whether or not to use the third quality and/or the bitrate of the third quality. If the third quality is not used for the additional area 122, the method 250 may move to the state 264. In the state 264, the processor 134 may select the target area using the region of interest 124 and the additional area 122. Next, the method 250 may move to the state 270. If the third quality is used for the additional area 122, the method 250 may move to the state 266.

In the state 266, the processor 134 may encode the additional area 122 using the third quality. Next, in the state 268, the processor 134 may select the target area of the upcoming video frames of the panoramic video based on the region of interest 124. Next, in the state 270, the processor 134 may encode the target area of the panoramic video with the higher quality. In the state 272, the processor 134 may encode the remaining area of the panoramic video with the lower quality. The processor 134 may stream the signal VIDEO to the playback device 54. Next, the method 250 may move to the state 274. The state 274 may end the method 250.

Figure 11:
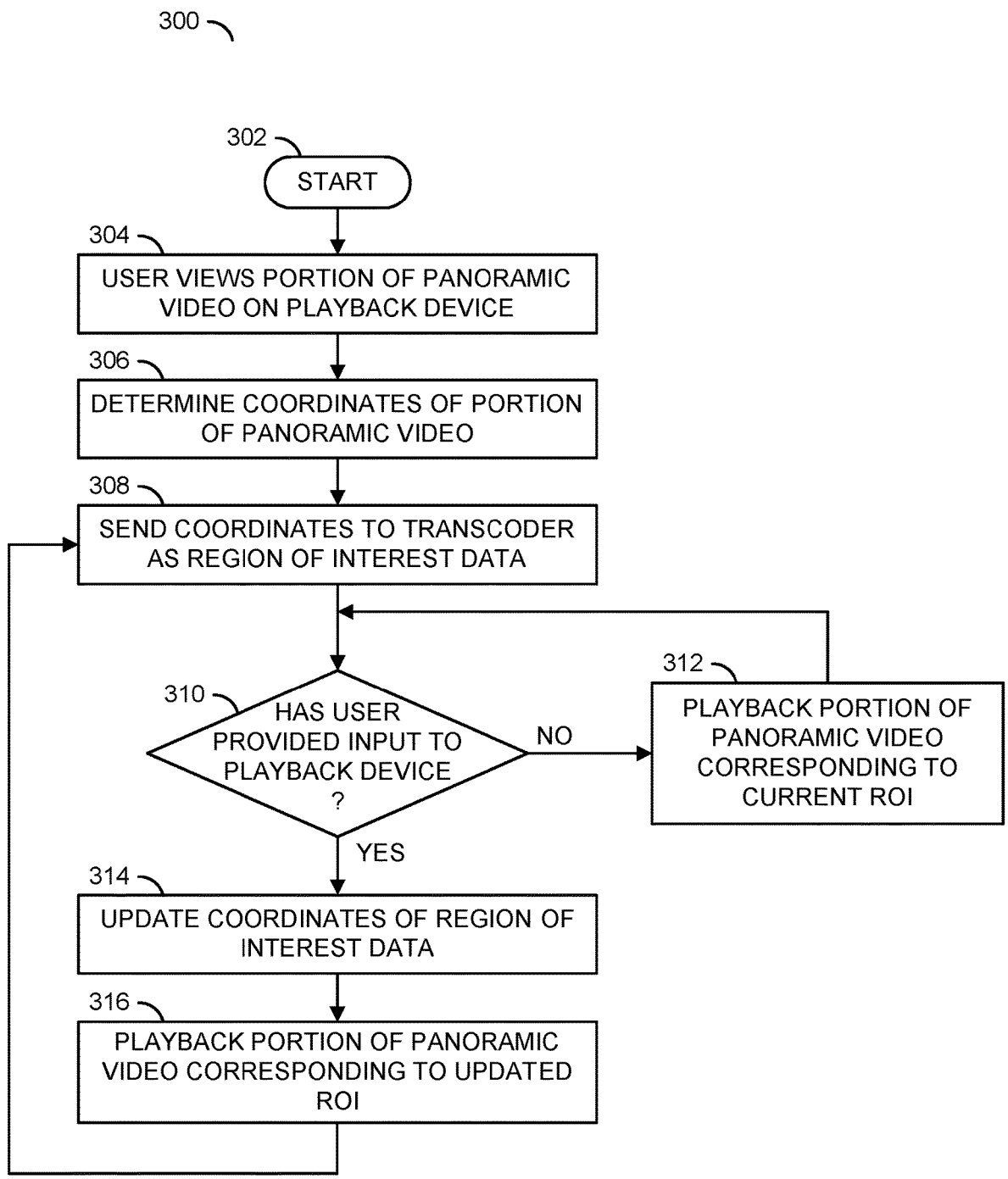
FIG. 11 is a flow diagram illustrating a method for playback of a panoramic video on a playback device.

Referring to FIG. 11, a method (or process) 300 is shown. The method 300 may playback a panoramic video on a playback device. The method 300 generally comprises a step (or state) 302, a step (or state) 304, a step (or state) 306, a step (or state) 308, a decision step (or state) 310, a step (or state) 312, a step (or state) 314, and a step (or state) 316.

The state 302 may start the method 300. In the state 304 the user (e.g., the pilot 82) may view the portion of the panoramic video (e.g., the region of interest) on the playback device 54. Next, in the state 306, the playback device 54 may determine the coordinates of the portion of the panoramic video currently displayed (e.g., the region of interest coordinates). In the state 308, the playback device 54 may send the coordinates to the transcoder (e.g., the processor 134) as the region of interest data (e.g., the signal ROI_COR). Next, the method 300 may move to the decision state 310.

In the decision state 310, the playback device 54 may determine whether the user has provided input to the playback device 54 (e.g., whether the pilot 82 has moved his or her head). If the user has not provided input to the playback device 54, the method 300 may move to the state 312. In the state 312, the playback device 54 may playback the portion of the panoramic video corresponding to the current region of interest 124. In one example, the portion of the panoramic video corresponding to the current region of interest may be the higher quality portion of the panoramic video. Next, the method 300 may return to the decision state 310. If the user has provided input to the playback device 54, the method 300 may move to the state 314.

In the state 314, the playback device 54 may update the coordinates of the region of interest data (e.g., the data in the signal ROI_COR). Next, in the state 316, the playback device 54 may playback the portion of the panoramic video corresponding to the updated region of interest. A new portion of the signal VIDEO may be presented in response to the input from the user. The quality of the playback may depend on whether or not the updated region of interest is in the additional area 122 and/or the region of interest 124. In one example, if the updated region of interest coordinates are in the additional area 122 and/or the region of interest 124, then the user may be presented with the higher quality portion of the panoramic video (e.g., if the input is a small head movement, the signal VIDEO may still have the high quality compression in the additional area 122 available for display). In another example, if the updated portion is not in the additional area 122 and/or the region of interest 124, then the user may be presented with the lower quality portion of the panoramic video (e.g., if the input is a large head movement, the signal VIDEO may not have the high quality compression in the area where the pilot 82 is looking). Next, the method 300 may return to the state 308.

In some embodiments, the playback device 54 may implement the state 312 and/or the state 316 by performing a refresh of the region of interest displayed to the pilot 82. For example (e.g., the state 312), when the pilot 82 has not moved their head (e.g., provided no input) the playback device 54 may refresh the region of interest displayed and the updated region of interest may still be the high quality portion of the signal VIDEO in the region of interest 124. In another example (e.g., the state 316), when the pilot 82 has moved their head but the region of interest displayed by the playback device 54 is still within the additional area 122 and/or the region of interest 124, the playback device 54 may refresh the region of interest and the region of interest displayed may still be the high quality portion of the signal VIDEO in the additional area 122 and/or the region of interest 124.

In still another example (e.g., the state 316), when the pilot 82 has moved their head and the region of interest displayed by the playback device 54 is not within the additional area 122 and/or the region of interest 124, the playback device 54 may refresh the region of interest and the region of interest displayed may be the remaining area 120 (e.g., the low quality portion of the panoramic video signal VIDEO). Generally, the playback device 54 updates the region of interest displayed by performing a refresh and the refresh will display a portion of the panoramic video file corresponding to the coordinates of the region of interest.

By sending the updated signal ROI_COR, the apparatus 100 may encode the new region of interest corresponding to where the pilot 82 has moved his or her head. In some embodiments, the update of the signal ROI_COR may be generated after a pre-determined amount of time (e.g., periodically, an amount of time set by the pilot 82, a refresh rate of the playback device 54, etc.). In some embodiments, the update of the signal ROI_COR may be generated after a pre-determined amount of input (e.g., after the pilot 82 moves his or her head a certain distance).

The pilot 82 may see the low quality compression for a short amount of time while the portion of the panoramic video corresponding to the updated region of interest is encoded and sent to the playback device 54. When the updated signal VIDEO is received by the playback device 54 and output for the pilot 82, the pilot 82 may see the higher quality compression. A length of time that the pilot 82 sees the lower quality compression may be determined by a network latency and/or a processing capability of the apparatus 100.

Figure 12:
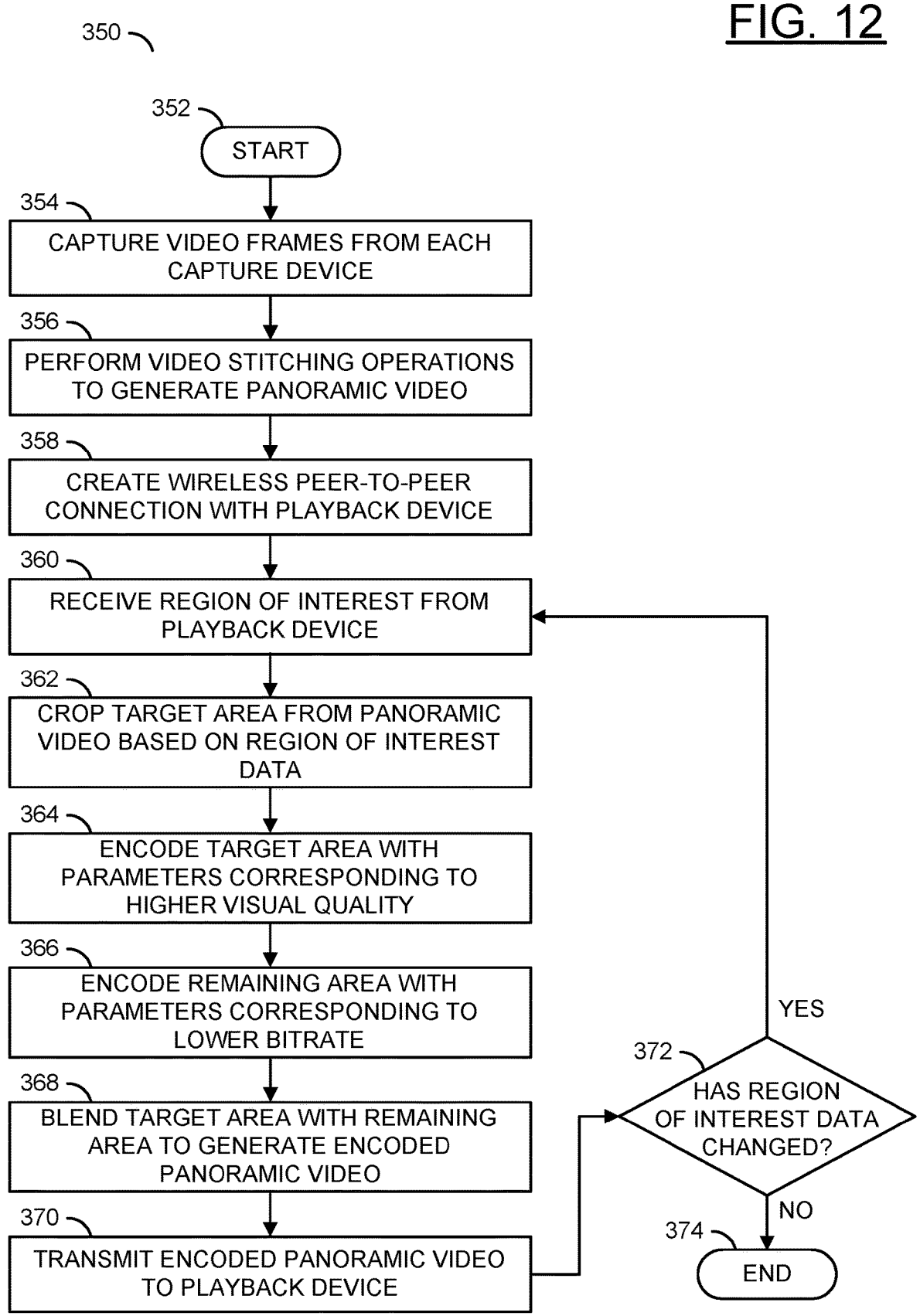
FIG. 12 is a flow diagram illustrating a method for performing low bitrate encoding of panoramic video to support live streaming over a wireless peer-to-peer connection.

Referring to FIG. 12, a method (or process) 350 is shown. The method 350 may perform low bitrate encoding of panoramic video to support live streaming over a wireless peer-to-peer connection. The method 350 generally comprises a step (or state) 352, a step (or state) 354, a step (or state) 356, a step (or state) 358, a step (or state) 360, a step (or state) 362, a step (or state) 364, a step (or state) 366, a step (or state) 368, a step (or state) 370, a decision step (or state) 372, and a step (or state) 374.

The state 352 may start the method 350. In the state 354, the camera 52 may capture the video frames (e.g., FRAMES_A-FRAMES_N) using the capture devices 60a-60n. The video frames FRAMES_A-FRAMES_N may be presented to the processor 134. In the state 356, the processor 134 may perform video stitching operations on the video frames FRAMES_A-FRAMES_N to generate the panoramic video having the full field of view covered by the capture devices 60a-60n. Next, in the state 358, the communication device 102 may create a wireless peer-to-peer connection with the playback device 54.

In the state 360, the communication device 102 may receive the region of interest from the playback device 54. The region of interest may be presented to the processor 134 by the communication device 102 as the signal ROI_COR. Next, in the state 362, the processor 134 may crop the target area from the panoramic video based on the region of interest data in the signal ROI_COR. In the state 364, the processor 134 may encode the target area (e.g., the window 122 and/or the window 124) with the parameters corresponding to the higher visual quality (e.g., higher bitrate). In the state 366, the processor 134 may encode the remaining area (e.g., the window 120) with the parameters corresponding to the lower bitrate (e.g., lower visual quality).

In the state 368, the processor 134 may blend the target area (e.g., the window 122 and/or the window 124) with the remaining area 120 to generate the encoded panoramic video (e.g., the signal VIDEO). Next, in the state 370, the processor 134 may present the signal VIDEO to the communication device 102. The communication device 102 may transmit the encoded panoramic video signal VIDEO to the playback device 54. Next, the method 350 may move to the decision state 372. In the decision state 372, the playback device 54 may determine whether the region of interest has changed (e.g., the pilot 82 has moved his or her head, the viewer has adjusted the display using a touchscreen input, the viewer has rotated the video using a mouse input, etc.). If the region of interest has changed, the method 350 may return to the state 360. If the region of interest has not changed, the method 350 may move to the state 374. The state 374 may end the method 350.

Figure 13:
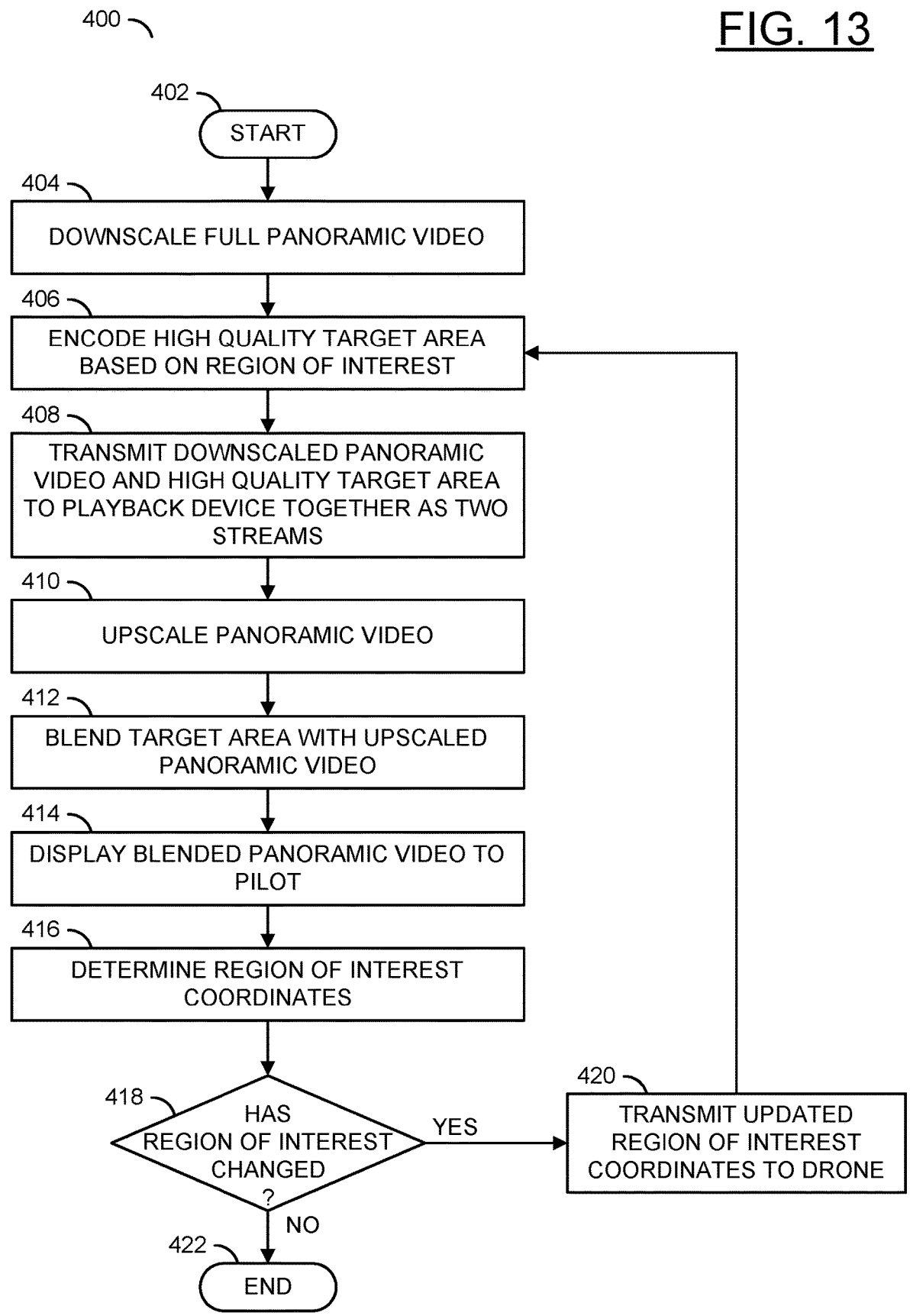
FIG. 13 is a flow diagram illustrating a method for blending a high quality region of interest with an upscaled panoramic video on a playback device.

Referring to FIG. 13, a method (or process) 400 is shown. The method 400 may blend a high quality region of interest with an upscaled panoramic video on a playback device. The method 400 generally comprises a step (or state) 402, a step (or state) 404, a step (or state) 406, a step (or state) 408, a step (or state) 410, a step (or state) 412, a step (or state) 414, a step (or state) 416, a decision step (or state) 418, a step (or state) 420, and a step (or state) 422.

The state 402 may start the method 400. The apparatus 100 may receive the video frames FRAMES_A-FRAMES_N from the capture devices 60a-60n. In some embodiments, the apparatus 100 may perform video stitching operations to generate a full field of view panoramic video. In some embodiments, the apparatus 100 may be configured to receive the full field of view panoramic video (e.g., the video may already be stitched). In the state 404, the processor 134 may be configured to downscale the full panoramic video. For example, the processor 134 may generate the downscaled full panoramic video signal FFOV_D. Next, in the state 406, the processor 134 may encode a high quality target area (e.g., the window 122 and/or the window 124) based on the region of interest data (e.g., the signal ROI_COR). For example, the high quality target area may be encoded using a set of quantization parameters that may result in a video having a high visual quality to generate the signal HQROI.

Next, in the state 408, the communication device 102 may transmit the downscaled panoramic video signal FFOV_D and the high quality target area HQROI to the playback device 54' together as two streams. In the state 410, the upscale module 152 of the playback device 54' may be configured to upscale the downscaled panoramic video signal FFOV_D. For example, the upscale module 152 may generate the signal FFOV. Next, in the state 412, the blending module 154 of the playback device 54' may be configured to blend the target area (e.g., from the signal HQROI) with the upscaled panoramic video. For example, the blending module 154 may receive the upscaled panoramic video signal FFOV from the upscale module 152 and perform blending operations to generate the panoramic video having the high visual quality target area using the signal HQROI and the lower visual quality for the remaining area 120 from the upscaled panoramic video signal FFOV.

Next, in the state 414, the playback device 54' may display the blended panoramic video to the pilot 82. The blending module 154 may generate the blended panoramic video signal VIDEO for playback. In the state 416, the playback device 54' may be configured to determine the region of interest coordinates (e.g., the coordinates that correspond to where in the video signal VIDEO the pilot 82 is currently looking). Next, the method 400 may move to the decision state 418. In the decision state 418, the playback device 54' may determine whether the region of interest has changed. In some embodiments, the playback device 54' may comprise a gyroscope to determine a head position of the pilot 82. In another example, software feedback from a video viewing application may provide the playback device 54' with the coordinates of the region of interest. If the region of interest has changed, the method 400 may move to the state 420. In the state 420, the playback device 54' may transmit the updated region of interest coordinates to the drone 72 (e.g., the communication device 102) as the signal ROI_COR. Next, the method 400 may return to the state 406. In the decision state 418, if the region of interest has not changed, the method 400 may move to the state 422. The state 422 may end the method 400.

The functions and structures illustrated in the diagrams of FIGS. 1 to 13 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to (i) receive a plurality of video streams each from a respective capture device, (ii) receive a set of coordinates corresponding to a direction a user of said apparatus is looking, said coordinates representing field of view data received from a playback device via a communication circuit and (iii) output an encoded panoramic video stream to said playback device via said communication circuit; and
a processor configured to (a) generate said encoded panoramic video stream that was generated by stitching the video streams from the capture devices, comprising a target area in said direction said user of said apparatus is looking and a downscaled panoramic video stream, from said plurality of video streams, (b) determine a region of interest in response to said field of view data, and (c) select said target area for one or more upcoming frames of said encoded panoramic video stream corresponding to said region of interest, wherein said processor generates said encoded panoramic video stream by (i) encoding said target area using first parameters and (ii) encoding said downscaled panoramic video stream using second parameters, and said first parameters generate a different bitrate for said target area than said second parameters generate for said downscaled panoramic video stream.

2. The apparatus according to claim 1, wherein said apparatus is configured as a system-on-chip.

3. The apparatus according to claim 1, wherein said apparatus is a component of an unmanned aerial vehicle.

4. The apparatus according to claim 1, wherein said communication circuit implements a peer-to-peer connection with said playback device.

5. The apparatus according to claim 1, wherein encoding said encoded panoramic video stream using said second parameters for said downscaled panoramic video stream results in a compression to reduce a bandwidth consumption when transmitting said encoded panoramic video stream.

6. The apparatus according to claim 1, wherein said playback device is implemented as at least one of a headset, a tablet computing device, a smartphone, a laptop computer and a desktop computer.

7. An apparatus comprising:
a plurality of camera devices configured to generate a plurality of video streams;
a processor configured to (i) generate an encoded panoramic video stream that was generated by stitching the video streams from the camera devices, said panoramic video stream comprising a target area corresponding to a direction a user of said apparatus is looking and a downscaled panoramic video stream, from said plurality of video streams,
(ii) determine a region of interest in response to region of interest data comprising a set of coordinates corresponding to said direction said user is looking received from a playback device, and
(iii) select said target area for one or more upcoming frames of said encoded panoramic video stream corresponding to said region of interest, wherein (a) said processor generates said encoded panoramic video stream by (i) encoding said target area using first parameters and (ii) encoding said downscaled panoramic video stream using second parameters, and (b) said first parameters generate a different bitrate for said target area than said second parameters generate for said downscaled panoramic video stream; and
a communication circuit configured to (i) implement a wireless connection with said playback device and (ii) transfer said encoded panoramic video stream to said playback device.

8. The apparatus according to claim 7, wherein said apparatus is implemented as an unmanned aerial vehicle.

9. The apparatus according to claim 8, wherein said unmanned aerial vehicle is autonomous.

10. The apparatus according to claim 8, wherein said unmanned aerial vehicle is configured to receive control input from a remote controller.

11. The apparatus according to claim 10, wherein said control input is transmitted separate from said encoded panoramic video stream.

12. The apparatus according to claim 7, wherein said wireless connection with said playback device is a peer-to-peer connection.

13. The apparatus according to claim 7, wherein said processor is configured to generate said encoded panoramic video stream from said plurality of video streams by performing video stitching operations.

14. A system comprising:
a headset configured to (i) transmit field of view data, (ii) receive a downscaled panoramic video stream, (iii) receive a target area of a set of coordinates corresponding to a direction a user of said system is looking, said coordinates representing a panoramic video stream, (iv) upscale said downscaled panoramic video stream, and (v) blend said target area with said upscaled panoramic video stream for playback on a display of said headset; and
an apparatus comprising a processor configured to (i) generate said panoramic video stream that was generated by stitching signals from a plurality of capture devices, said panoramic video stream comprising a target area in said direction said user of said apparatus is looking from a plurality of video streams, (ii) determine a region of interest in response to said field of view data received from said headset, (iii) select said target area for one or more upcoming frames of said panoramic video stream corresponding to said region of interest, and (vi) present an encoded panoramic video stream comprising (a) an encoded downscaled panoramic video stream and (b) an encoded target area to said headset, wherein (a) said processor generates said downscaled panoramic video stream from said panoramic video stream, (b) said processor generates said encoded panoramic video stream by (i) encoding said target area using first parameters and (ii) encoding said downscaled panoramic video stream using second parameters, and (c) said first parameters generate a different bitrate for said target area than said second parameters generate for said downscaled panoramic video stream.

15. The system according to claim 14, wherein said system implements a peer-to-peer connection between said headset and a panoramic camera mounted on an unmanned aerial vehicle.

16. The system according to claim 14, wherein said apparatus is implemented as a component of a panoramic camera.

17. The system according to claim 14, wherein said downscaled panoramic video stream and said target area are transmitted to said headset as two streams.

18. The system according to claim 14, wherein said region of interest comprises coordinates corresponding to a field of view currently visible on said display of said headset.

19. The system according to claim 14, wherein (i) said apparatus is implemented on a server and (ii) said server implements a connection between said headset and a camera configured to capture said plurality of video streams.

20. The apparatus according to claim 1, wherein said region of interest is adjusted periodically.

* * * * *